United States Patent
Omura et al.

(10) Patent No.: US 11,748,000 B2
(45) Date of Patent: Sep. 5, 2023

(54) STORAGE SYSTEM AND FILE ARRANGEMENT METHOD OF STORAGE SYSTEM

(71) Applicant: Hitachi, Ltd., Tokyo (JP)

(72) Inventors: Koki Omura, Tokyo (JP); Yuta Nishihara, Tokyo (JP); Arata Hayashi, Tokyo (JP)

(73) Assignee: HITACHI, LTD., Tokyo (JP)

(*) Notice: Subject to any disclaimer, the term of this patent is extended or adjusted under 35 U.S.C. 154(b) by 0 days.

(21) Appl. No.: 17/689,059

(22) Filed: Mar. 8, 2022

(65) Prior Publication Data

US 2022/0413716 A1    Dec. 29, 2022

(30) Foreign Application Priority Data

Jun. 24, 2021 (JP) ................................. 2021-105127

(51) Int. Cl.
   *G06F 3/06* (2006.01)
(52) U.S. Cl.
   CPC .......... *G06F 3/0622* (2013.01); *G06F 3/0637* (2013.01); *G06F 3/0644* (2013.01); *G06F 3/0653* (2013.01); *G06F 3/0685* (2013.01)
(58) Field of Classification Search
   None
   See application file for complete search history.

(56) References Cited

U.S. PATENT DOCUMENTS

| | | | |
|---|---|---|---|
| 8,880,830 B1 | 11/2014 | Akutsu et al. | |
| 8,918,609 B2 | 12/2014 | Iwamitsu et al. | |
| 2005/0038954 A1* | 2/2005 | Saliba | G06F 3/0607 711/100 |
| 2010/0115215 A1* | 5/2010 | Rosychuk | G06F 11/1456 711/E12.001 |
| 2016/0179420 A1 | 6/2016 | Mei et al. | |
| 2019/0354290 A1* | 11/2019 | Ben Dayan | G06F 16/182 |
| 2022/0206702 A1* | 6/2022 | Gao | G06F 3/0688 |

FOREIGN PATENT DOCUMENTS

| | | |
|---|---|---|
| JP | 2005-099971 A | 4/2005 |
| JP | 2016-118821 A | 6/2016 |

OTHER PUBLICATIONS

Japanese Office Action dated Jan. 4, 2023 for Japanese Patent Application No. 2021-105127.

* cited by examiner

*Primary Examiner* — Charles J Choi
(74) *Attorney, Agent, or Firm* — Volpe Koenig

(57) ABSTRACT

To selectively use cost, performance, reliability, and security characteristics of storage devices in an appropriate manner. A storage system has a plurality of volumes of which reliability and security levels differ from one another, and a controller of the storage system determines a reliability requirement and a security requirement of a file based on at least one of a type and a content of the file, determines a volume to store the file based on the determination result, and stores the file in the determined volume.

9 Claims, 29 Drawing Sheets

[Requirement definition table] 108

```
File name , security , reliability
A , high , high
B , high , low
C , low , high
```

FIG. 3

[Priority definition table] 109

```
Priority(P)
I  (>II>III>IV)
```

FIG. 4

[Tier management table] 110

```
Tier name , security , reliability , cost , capacity , priority
I(T1), high , high , high , 1000 , 0
I(T2), high , high , low , 1000 , 7
II(T1), low , high , high , 1000 , 3
II(T2), low , high , low , 1000 , 6
III(T1), high , low , high , 1000 , 2
III(T2), high , low , low , 1000 , 5
VI(T1), low , low , high , 1000 , 1
VI(T2), low , low , low , 1000 , 4
```

FIG. 5

[Infection information table]     117

Incident ID, infection time point, infected terminal (IP Address)
S1,2020/05/03 12:00,33.33.3.3

FIG. 6

[Access history table]     115

File Name , IP Address , DATE
A,11.11.1.1,2020/04/01 00:10
A,22.22.2.2,2020/05/01 12:00
A,33.33.3.3,2020/05/02 12:00
B,11.11.1.1,2020/04/10 00:10
B,11.11.1.1,2020/05/02 06:00
B,33.33.3.3,2020/05/03 02:00
C,11.11.1.1,2020/04/12 00:10
C,22.22.2.2,2020/05/03 04:00
C,33.33.3.3,2020/05/03 12:00

FIG. 7

[Generation information management table]

118

```
File Name, acquisition time point, tier, file size
A,-,I(T1),-
B,-,I(T1),-
C,-,II(T1),-
A,2020/05/01 00:00,I(T2),100
B,2020/05/01 00:00,III(T2),20
C,2020/05/01 00:00,II(T2),30
A,2020/05/02 00:00,I(T2),10
B,2020/05/02 00:00,III(T2),10
C,2020/05/02 00:00,II(T2),10
A,2020/05/03 00:00,I(T2),10
B,2020/05/03 00:00,III(T2),10
C,2020/05/03 00:00,II(T2),10
...
```

FIG. 8

[File size table]

116

```
File name , size
A , 10
B , 10
C , 10
```

FIG. 9

STORAGE SYSTEM AND FILE ARRANGEMENT METHOD OF STORAGE SYSTEM

CROSS-REFERENCE TO RELATED APPLICATIONS

This application is based upon and claims the benefit of priority from Japanese Patent Application No. 2021-105127 filed in Japan Patent Office on Jun. 24, 2021, the contents of which are hereby incorporated by reference.

BACKGROUND

The present disclosure relates to a storage system and to a file arrangement method of the storage system.

Recently, there is an arising market need for a hybrid cloud that integrally manages a plurality of clouds and enhancement of security is cited as an issue faced by such a hybrid cloud.

Accordingly, a way of thinking called "Cyber Resilience" which involves detecting and dealing with the implementation and expression of malware has become mainstream in the security field and methods such as achieving early restore from prolonged incubation of malware by combining backup data of multiple generations and security software are being considered.

Therefore, storages are required to have enough capacity to store backup data of multiple generations and to provide access to the backup data of multiple generations.

Tiering techniques are known as techniques for achieving both data capacity and performance (for example, refer to U.S. Pat. No. 8,880,830 and U.S. Pat. No. 8,918,609). The technique disclosed in U.S. Pat. No. 8,880,830 involves selectively using a plurality of media with different costs and performance characteristics by rearranging data based on frequency of access with respect to the data.

SUMMARY

On the other hand, circumstances surrounding storages are such that the emergence of NVMe (NVM Express: Non-Volatile Memory Express), hybrid clouds, external storage virtualization technology (for example, UVM: Universal Volume Manager), and the like has enabled media (infrastructure) that differ from one another in not only cost and performance characteristics but also in reliability and security characteristics to be present in plurality within a single system.

However, the techniques described in U.S. Pat. Nos. 8,880,830 and 8,918,609 do not take into consideration characteristics other than cost and performance characteristics. Therefore, it is difficult to manage media of which reliability and/or security characteristics differ from one another or pieces of data of which reliability and/or security requirements differ from one another with a single system.

More specifically, in an environment where media of which reliability and/or security characteristics differ from one another are present, only data that can be stored in media with lowest reliability and/or security characteristics can be managed. In addition, in an environment where pieces of data of which reliability and/or security requirements differ from one another are present, infrastructure must be constructed solely using media capable of storing pieces of data with highest reliability and/or security requirements. As a result, there is a problem of increased cost.

A tiering technique that enables cost, performance, reliability, and security characteristics of a system to be selectively used in an appropriate manner is required in order to achieve goals in both costs (management cost and media cost) and performance (access performance and restore performance) of the system.

An object of the present disclosure is to provide a storage system capable of selectively using cost, performance, reliability, and security characteristics of a storage device in an appropriate manner and to provide a file arrangement method of the storage system.

A storage system according to an aspect of the present disclosure is a storage system which is coupled to a host and which performs an operation with respect to a stored file on the basis of a file operation request from the host, the storage system including: a controller; and a plurality of storage devices of which reliability and security levels differ from one another, wherein the controller determines a reliability requirement and a security requirement of the file based on at least one of a type and a content of the file, determines a storage device to store the file in based on the determination result, and stores the file in the determined storage device.

According to the aspect of the present disclosure, a storage system capable of selectively using cost, performance, reliability, and security characteristics of a storage device in an appropriate manner and a file arrangement method of the storage system can be realized.

BRIEF DESCRIPTION OF THE DRAWINGS

FIG. 3 is a diagram showing an example of a requirement definition table of the storage system according to the embodiment;

FIG. 4 is a diagram showing an example of a priority definition table of the storage system according to the embodiment;

FIG. 5 is a diagram showing an example of a tier management table of the storage system according to the embodiment;

FIG. 6 is a diagram showing an example of an infection information table of the storage system according to the embodiment;

FIG. 7 is a diagram showing an example of an access history table of the storage system according to the embodiment;

FIG. 8 is a diagram showing an example of a generation information management table of the storage system according to the embodiment;

FIG. 9 is a diagram showing an example of a file size table of the storage system according to the embodiment;

DETAILED DESCRIPTION OF THE EMBODIMENTS

Figure 1:
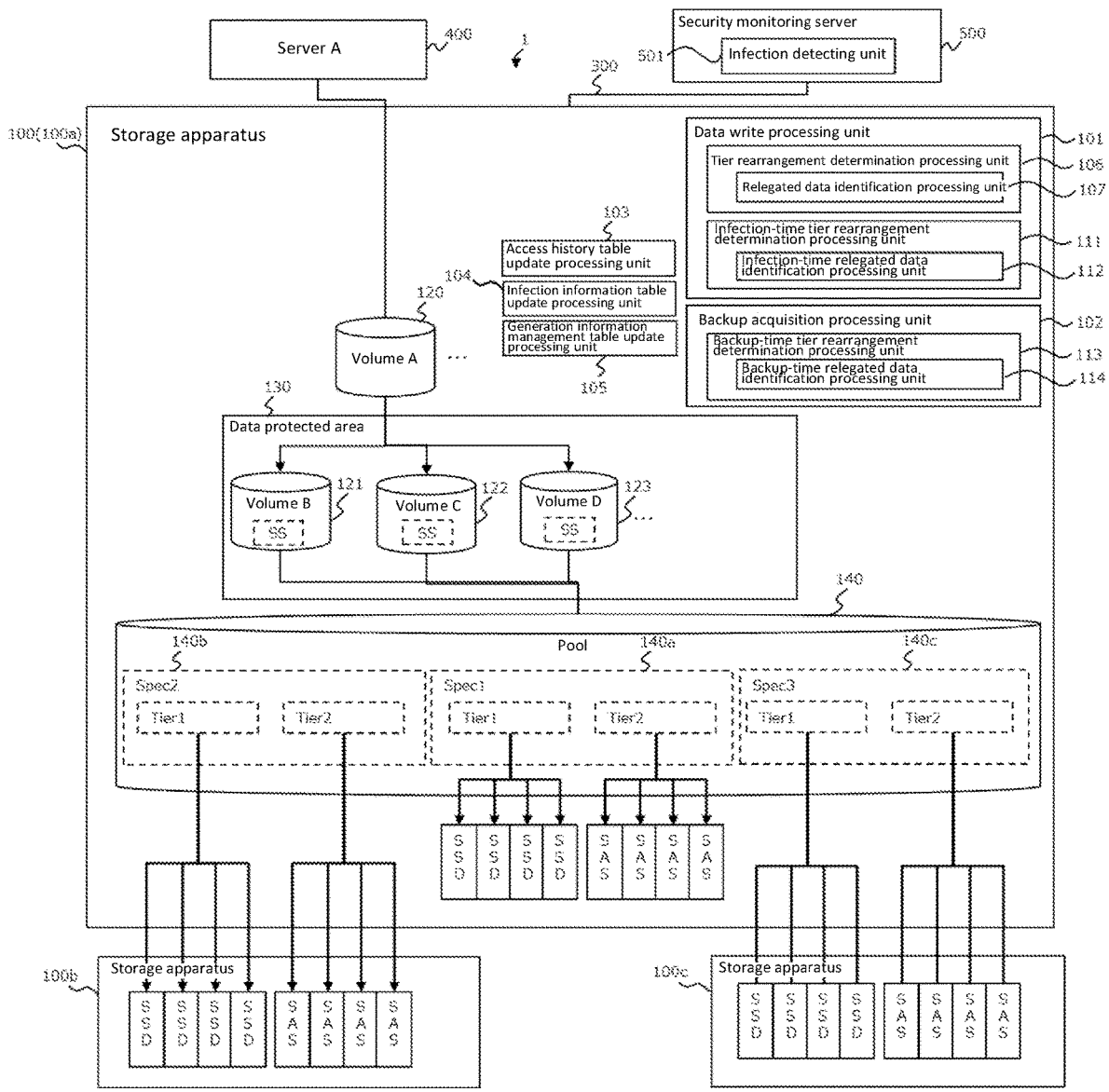
FIG. 1 is a diagram showing a schematic configuration of a storage system according to an embodiment.

Hereinafter, an embodiment of the present invention will be described with reference to the drawings. It should be noted that the embodiment described below is not intended to limit the invention as set forth in the accompanying claims and that all of the elements described in the embodiment and combinations thereof are not necessarily essential to solutions proposed by the invention.

In the following description, a "memory" refers to one or more memories and may typically be a main storage device. At least one memory in a memory unit may be a volatile memory or a non-volatile memory.

In addition, in the following description, a "processor" refers to one or more processors. While at least one processor is typically a microprocessor such as a CPU (Central Processing Unit), the processor may be a processor of another type such as a GPU (Graphics Processing Unit). At least one processor may be a single-core processor or a multi-core processor.

Furthermore, at least one processor may be a processor in a broad sense of the term such as a hardware circuit (for example, an FPGA (Field-Programmable Gate Array) or an ASIC (Application Specific Integrated Circuit)) that performs a part of or all of a processing step.

In the present disclosure, a storage apparatus (device) includes a single storage drive such as a single HDD (Hard Disk Drive) or a single SSD (Solid State Drive), a RAID apparatus including a plurality of storage drives, and a plurality of RAID apparatuses. In addition, when the drive is an HDD, the storage apparatus (device) may include an SAS (Serial Attached SCSI) HDD or an NL-SAS (near-line SAS) HDD.

In addition, although information that enables an output to be obtained in response to an input will be described below using expressions such as an "xxx table", the information may be data of any structure or may be a learning model such as a neural network that generates an output with respect to an input. Therefore, an "xxx table" can be referred to as "xxx information".

In addition, in the following description, a configuration of each table merely represents an example and one table may be divided into two or more tables and all of or a part of two or more tables may constitute one table.

Furthermore, while a "program" is sometimes used as a subject when describing a processing step in the following description, since a program causes a prescribed processing step to be performed by appropriately using a storage resource (such as a memory) and/or a communication interface device (such as a port) when being executed by a processor, a "processor" may be used instead as a subject of the processing step. A processing step described using a program as a subject may be considered a processing step performed by a processor or by a computer including the processor.

In the following description, when an operating entity such as a "xx unit" is described, this means that a processor of an information processing apparatus constituting the storage system reads and loads processing contents of the xx unit being a program stored in a memory and realizes functions (to be described in detail later) of the xx unit.

The program may be installed on an apparatus such as a computer or may be a recording medium (for example, a non-transitory recording medium) that can be read by a program distribution server or the computer. In addition, in the following description, two or more programs may be realized as one program or one program may be realized as two or more programs.

In diagrams illustrating an embodiment, portions having a same function will be denoted by a same reference sign and repetitive descriptions thereof will be omitted.

In addition, in the following description, when describing elements of a same type without distinguishing the elements from one another, a reference sign (or a common sign among reference signs) may be used, but when describing elements of a same type by distinguishing the elements from one another, identification numbers (or reference signs) of the elements may be used.

In order to facilitate understanding of the invention, positions, sizes, shapes, ranges, and the like of the respective components shown in the drawings may not always represent actual positions, sizes, shapes, ranges, and the like. Consequently, the present invention is not necessarily limited to the positions, sizes, shapes, ranges, and the like being disclosed in the drawings.

FIG. 1 is a diagram showing a schematic configuration of a storage system according to an embodiment.

A storage system 1 according to the present embodiment includes a plurality of storage apparatuses 100a to 100c. While the present embodiment describes an example using three storage apparatuses 100a to 100c, there is no limit to the number of storage apparatuses as long as there are a plurality thereof. The storage apparatus 100a is configured to be capable of mutually communicating with a server A 400 being a host and a security monitoring server 500 via a network 300. In addition, the storage apparatus 100a and the storage apparatuses 100b and 100c are configured to be capable of transmitting and receiving information to and from each other via communication lines.

The storage apparatus 100 is constituted of an apparatus capable of performing various kinds of information processing of which an example is an information processing apparatus such as a computer. A hardware configuration of the storage apparatus 100 will be described later.

The server A 400 issues various operation (read, write, delete, update, and the like) instructions with respect to files stored in the storage apparatuses 100a to 100c and the storage apparatuses 100a to 100c execute an operation of a stored file on the basis of the operation instruction from the server A 400. Although FIG. 1 only illustrates the server A 400, there is no limit to the number of servers 400.

The security monitoring server 500 has an infection detecting unit 501. The infection detecting unit 501 is constructed by executing known security software or the like. The infection detecting unit 501 constantly (including intermittently) monitors the server A 400, and when the server A 400 is infected by malware (including computer viruses), the infection detecting unit 501 detects the event (incident) of the infection and acquires information that identifies an infection time point and an infected terminal (the server A 400). The security monitoring server 500 according to the present embodiment acquires an IP address of the server A 400 as information that identifies an infected terminal. The information for identifying an infection time point and an infected terminal acquired by the security monitoring server 500 is stored in an infection information table 117 (refer to FIG. 6) not illustrated in FIG. 1.

The storage apparatus 100a has a data write processing unit 101, a backup acquisition processing unit 102, an access history table update processing unit 103, an infection information table update processing unit 104, a generation information management table update processing unit 105, and a storage apparatus.

Based on a data (file) write instruction from the server A 400, the data write processing unit 101 writes a file to be a write target to a storage apparatus of the storage apparatuses 100a to 100c. In doing so, the data write processing unit 101 manages the storage apparatus of the storage apparatus 100 as a plurality of logical volumes. In the storage apparatus 100a according to the present embodiment, the data write processing unit 101 manages the storage apparatus as a volume A 120 in which a file operation is performed based on an operation instruction from the server A 400 and volumes B 121 to D 123 within a data protected area 130 which back up and store, on a regular basis, files stored in the volume A 120.

In addition, among the storage apparatuses of the storage apparatus 100, storage apparatuses that correspond to the volumes B 121 to D 123 are constituted of a plurality of physical storage devices with different performances. In the storage apparatus 100 according to the present embodiment shown in FIG. 1, storage apparatuses are constituted of SSDs and SASs (Serial Attached SCSI HDDs). Furthermore, the data write processing unit 101 manages the volumes B 121 to D 123 by classifying the volumes B 121 to D 123 into a plurality of storage tiers according to performances of the physical storage devices. The storage apparatus 100 according to the present embodiment manages the volumes B 121 to D 123 as a pool 140 in which an SSD is classified as a first tier (Tier 1) and an SAS is classified as a second tier (Tier 2).

In the storage system 1 according to the present embodiment, the pool 140 is a virtualized storage area and a storage area in the pool 140 has Spec1 140a that corresponds to a physical storage device provided inside the storage apparatus 100a, Spec2 140b that corresponds to a physical storage device provided inside the storage apparatus 100b, and Spec3 140c that corresponds to a physical storage device provided inside the storage apparatus 100c.

It should be noted that the number of tiers and which physical storage device is to be allocated to which tier are arbitrary and are not limited to the illustrated example.

The data write processing unit 101 has a tier rearrangement determination processing unit 106. The tier rearrangement determination processing unit 106 performs, with respect to a file stored in the pool 140, a tier rearrangement operation of the file which takes into consideration a reliability requirement and a security requirement of the file and reliability and a security level of a physical storage device provided in the storage apparatuses 100a to 100c. While details will be provided later, in the storage system 1 according to the present embodiment, the storage apparatuses 100a to 100c have respectively different reliability and security levels depending on a place or a location where the storage apparatuses 100a to 100c are installed, specifications of the communication lines between the storage apparatus 100a and the storage apparatuses 100b and 100c, and the like.

The tier rearrangement determination processing unit 106 has a relegated data identification processing unit 107. Details of a tier rearrangement operation of a file by the tier rearrangement determination processing unit 106 and the relegated data identification processing unit 107 will be provided later with reference to flow charts.

In addition, the data write processing unit 101 stores a requirement definition table 108, a priority definition table 109, and a tier management table 110. Details of the requirement definition table 108, the priority definition table 109, and the tier management table 110 will be provided later.

The data write processing unit 101 has an infection-time tier rearrangement determination processing unit 111. With respect to a file stored in the pool 140, the infection-time tier rearrangement determination processing unit 111 performs, with the detection of a malware infection of the server A 400 by the security monitoring server 500 as a trigger, a tier rearrangement operation of the file which takes into consideration information for identifying an infection time point of the malware, a terminal (the server A 400) infected by the malware, and an update history of the file.

The infection-time tier rearrangement determination processing unit 111 has an infection-time relegated data identification processing unit 112. Details of a tier rearrangement operation of a file by the infection-time tier rearrangement determination processing unit 111 and the infection-time relegated data identification processing unit 112 will be provided later with reference to flow charts.

Based on an instruction from a user of the server A 400, the backup acquisition processing unit 102 regularly backs up a file stored in the volume A 120 on which a file operation is to be performed and stores the file in the volumes B 121 to D 123 within the data protected area 130. In doing so, the backup acquisition processing unit 102 stores the file stored inside the volume A 120 as a snapshot (notated as SS in FIG. 1 and hereinafter referred to as an SS) at a time point of backup processing. In other words, the backup acquisition processing unit 102 manages a file as an SS for each backup generation.

The backup acquisition processing unit 102 has a backup-time tier rearrangement determination processing unit 113, and the backup-time tier rearrangement determination processing unit 113 has a backup-time relegated data identification processing unit 114. Details of a tier rearrangement operation of a file by the backup-time tier rearrangement determination processing unit 113 and the backup-time relegated data identification processing unit 114 will be provided later with reference to flow charts.

The access history table update processing unit 103 updates an access history table 115 (FIG. 7) and a file size table 116 (FIG. 9) based on a file access from the user of the server A 400 to the storage system 1. The access history table update processing unit 103 stores the access history table 115 and the file size table 116.

The infection information table update processing unit 104 updates the infection information table 117 (FIG. 6) when the infection detecting unit 501 of the security monitoring server 500 detects a malware infection of the server A 400. The infection information table update processing unit 104 stores the infection information table 117.

Every time an SS of a file stored in the volumes B 121 to D 123 inside the data protected area 130 is acquired, the generation information management table update processing unit 105 acquires and manages information related to a generation and the like of the SS. The generation information management table update processing unit 105 stores a generation information management table 118 (FIG. 8).

Figure 2:
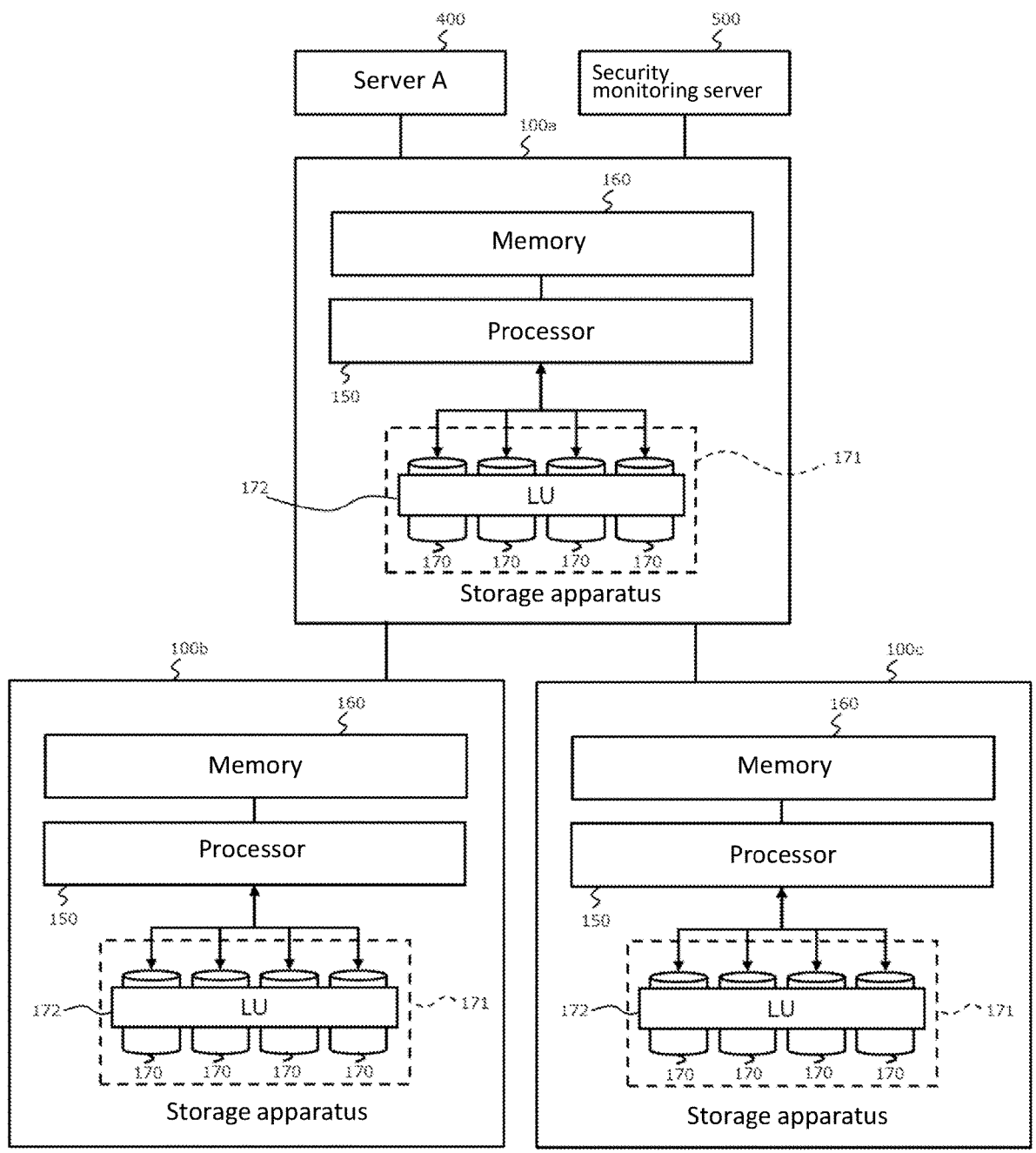
FIG. 2 is a diagram showing an example of a hardware configuration of the storage system according to the embodiment.

FIG. 2 is a diagram showing an example of a hardware configuration of the storage system 1 according to the embodiment.

The storage apparatus 100 is constituted of an apparatus capable of performing various kinds of information processing. The storage apparatus 100 has a processor 150, a memory 160, and a communication interface (not illustrated), and when necessary, further includes an input apparatus such as a mouse or a keyboard and a display apparatus such as a display.

The processor 150 is, for example, a CPU (Central Processing Unit), a GPU (Graphic Processing Unit), or an FPGA (Field-Programmable Gate Array). The memory 160 is, for example, a magnetic storage medium such as an HDD (Hard Disk Drive) or a semiconductor storage medium such as a RAM (Random Access Memory), a ROM (Read Only Memory), or an SSD (Solid State Drive). In addition, a combination of an optical disk such as a DVD (Digital Versatile Disk) and an optical disk drive may also be used as the storage medium. Otherwise, known storage media such as magnetic tape media may also be used as the storage medium.

The memory 160 stores a program such as firmware. The program such as firmware is read from the memory 160 upon start of operation (for example, at power-on) of the storage apparatus 100 and executed to perform overall control of the storage system 1 including the storage apparatus 100. In addition to the program, the memory 160 also stores data and the like necessary to perform various kinds of processing of the storage apparatus 100.

Furthermore, the storage apparatus 100 is equipped with a plurality of physical storage devices 170. The plurality of physical storage devices 170 have the SSDs and the SASs described earlier. The storage apparatus 100 may obviously include other physical storage devices such as various drives capable of writing and reading data including a hard disk device, a semiconductor memory device, an optical disk device, and a magneto-optical disk device. Furthermore, various storage apparatuses such as a flash memory, a FeRAM (Ferroelectric Random Access Memory), an MRAM (Magnetoresistive Random Access Memory), and a Phase-change memory can also be used. Moreover, for example, a configuration featuring a mixture of storage apparatuses of different types may be adopted.

A storage area respectively included in the plurality of physical storage devices 170 forms a logical group 171 and logical volumes 172 (for example, the volumes A 120 to D 123) are configured in a storage area of the logical group 171. Although FIG. 2 shows a single logical volume 172, in reality, a plurality (a large number) of logical volumes 172 are generated.

FIG. 3 is a diagram showing an example of the requirement definition table 108 of the storage system 1 according to the embodiment.

The requirement definition table 108 has, as an entry, a file name, a security requirement, and a reliability requirement of a file stored in the storage apparatus 100 of the storage system 1. While details of the security requirement and the reliability requirement will be provided later, in the storage system 1 according to the present embodiment, the security requirement and the reliability requirement are respectively set with respect to each file to any of "high" and "low".

FIG. 4 is a diagram showing an example of the priority definition table 109 of the storage system 1 according to the embodiment.

The priority definition table 109 has, as an entry, a priority for storing a file in a physical storage device of each storage apparatus 100. As will be described later, a physical storage device of each storage apparatus 100 is classified as any of I, II, III, and IV based on reliability and a security level thereof and the priority definition table 109 defines priorities of these classifications.

FIG. 5 is a diagram showing an example of the tier management table 110 of the storage system 1 according to the embodiment.

The tier management table 110 has, as an entry, a classification I to IV and a tier (Tier 1 or Tier 2, hereinafter respectively abbreviated as T1 and T2) having been set to the storage apparatus 100 of the storage system 1 and security, reliability, a cost, a capacity, and a priority for each classification I to IV and each tier T1 or T2.

FIG. 6 is a diagram showing an example of the infection information table 117 of the storage system 1 according to the embodiment.

The infection information table 117 has, as an entry, an ID for identifying an event (incident) of an infection to malware, a time point of the infection, and an IP address of an infected terminal.

FIG. 7 is a diagram showing an example of the access history table 115 of the storage system 1 according to the embodiment.

The access history table 115 has, as an entry, a file name, an IP address of a terminal having accessed the file, and an access time point.

FIG. 8 is a diagram showing an example of the generation information management table 118 of the storage system 1 according to the embodiment.

The generation information management table 118 has, as an entry, a file name, a time point at which the file is acquired, a tier (including a classification) in which the acquired file had been stored, and a file size.

FIG. 9 is a diagram showing an example of the file size table 116 of the storage system 1 according to the embodiment.

The file size table 116 has, as an entry, a file name and a size of the file.

Next, an outline of operations of the storage system 1 according to the present embodiment will be explained with reference to FIGS. 10 to 13.

Figure 10:
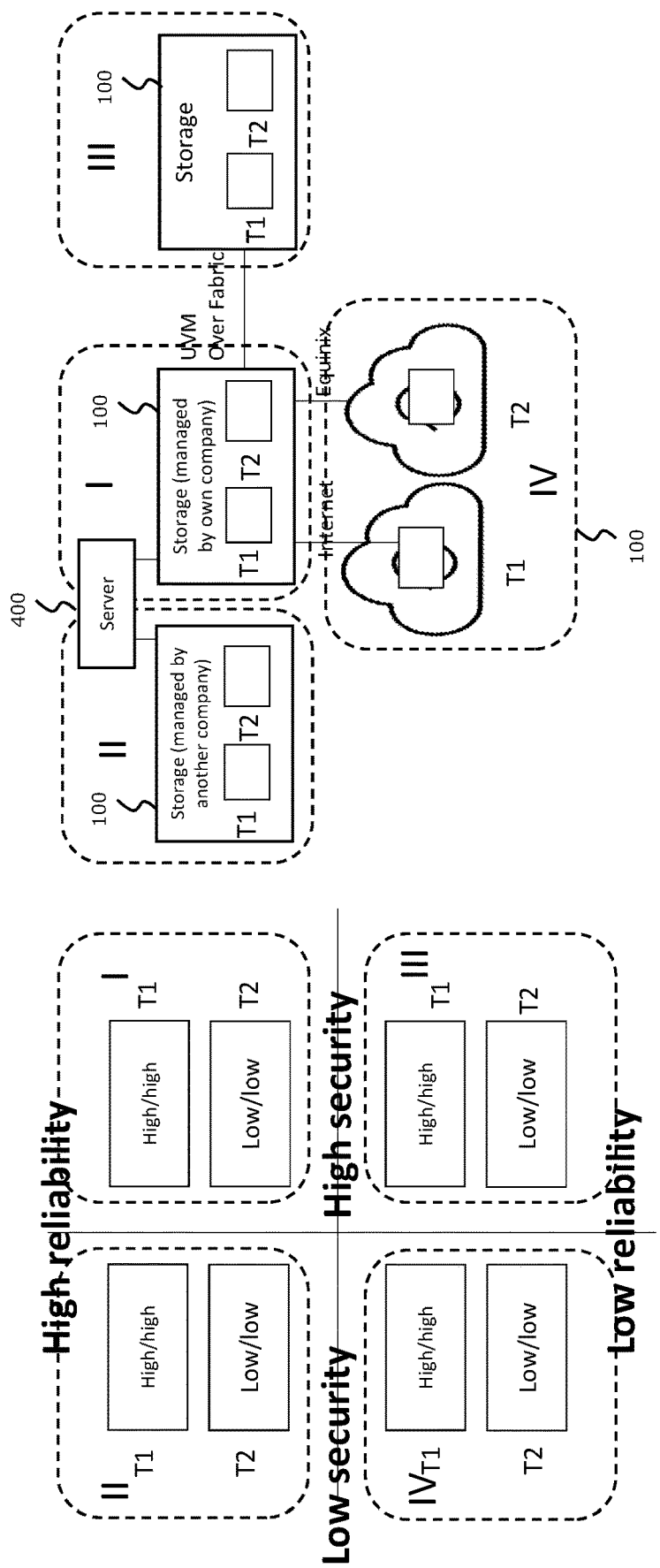
FIG. 10 is a diagram showing an example of handling a storage tier in the storage system according to the embodiment.

FIG. 10 is a diagram for explaining handling of a storage tier of a file in the storage system 1 according to the present embodiment. A characteristic of the handling of a storage tier of a file in the storage system 1 according to the present embodiment is "a storage tier and tier rearrangement which take reliability and a security level into consideration".

A general file tiering technique involves tiering physical storage devices of which costs and performance characteristics differ from one another. To take the storage system 1 according to the present embodiment as an example, T1 is constituted of SSDs having a high cost but a high access speed and T2 is constituted of SASs of which the cost is lower than that of SSDs but the access speed is slower than that of SSDs.

However, when a physical storage device with a high cost but providing speedy access such as an NVMe is coupled to another storage apparatus 100 by Over Fabric (NVMe over Fabrics), reliability of the physical storage device may be described as being lower than that of a storage apparatus 100 (for example, the storage apparatus 100a) being directly coupled to the server A 400. In addition, when a physical storage device with a low cost but providing slow access such as an SAS is arranged at a location of which management and operation have been delegated to an outside organization such as a cloud, the security level of the physical storage device may differ from that of the storage apparatus 100 being managed and operated by a company to which the user of the server A 400 belongs.

In consideration thereof, in the storage system 1 according to the present embodiment, a total of eight tiers are provided in accordance with a reliability and a "high" or "low" security level of a physical storage device in addition to the tiers (T1 and T2) provided according to cost and performance characteristics, and files are to be arranged or rearranged using the eight tiers.

Specifically, as shown in a left-side diagram in FIG. 10, a configuration is adopted in which a physical storage device with high reliability and a high security level is classified as I, a physical storage device with low reliability and a high security level is classified as II, a physical storage device with high reliability and a low security level is classified as III, and a physical storage device with low reliability and a low security level is classified as classified as IV, and tiers T1 and T2 are provided in each classification.

In this case, "reliability" according to the present embodiment is expressed by an index such as a failure rate, availability, or an operating rate. For example, if reliability is to be evaluated based on the operating rate, the operating rate for classifications I and II is 99.99999% while the operating rate for classifications III and IV is 99.9%.

In addition, "security" according to the present embodiment refers to safeguarding the storage system 1 from disasters, misuse, and unauthorized accesses. "Security" also refers to maintaining confidentiality, integrity, and availability with respect to any of hardware, software, data, and networks. While security can be evaluated based on some kind of index, security may also represent a relative evaluation.

The classifications I to IV will be described in greater detail with reference to a right-side diagram in FIG. 10.

The storage apparatus 100 classified as the classification I is, as an example, a self-managed (managed by the company to which the user of the server A 400 belongs) storage apparatus 100. Therefore, the storage apparatus 100 can be considered as having high reliability and a high security level. In addition, the storage apparatus 100 classified as the classification II is, as an example, a storage apparatus 100 managed by another company. Therefore, the storage apparatus 100 can be considered as having high reliability but a low security level. In addition, the storage apparatus 100 classified as the classification III is, as an example, a self-managed storage apparatus 100 that is coupled to a classification I storage apparatus 100 by UVM or Over Fabric. Therefore, the storage apparatus 100 can be considered as having lower reliability as compared to a classification I storage apparatus 100 but a high security level. Furthermore, the storage apparatus 100 classified as the classification IV is, as an example, a so-called cloud storage apparatus 100. Therefore, the storage apparatus 100 can be considered as having low reliability and a low security level.

As described above, the storage apparatuses 100 (as well as the physical storage devices included in the storage apparatuses 100) can be classified into classifications I to IV and tiered in consideration of installation locations, coupling modes, and the like of the storage apparatuses 100.

Figure 11:
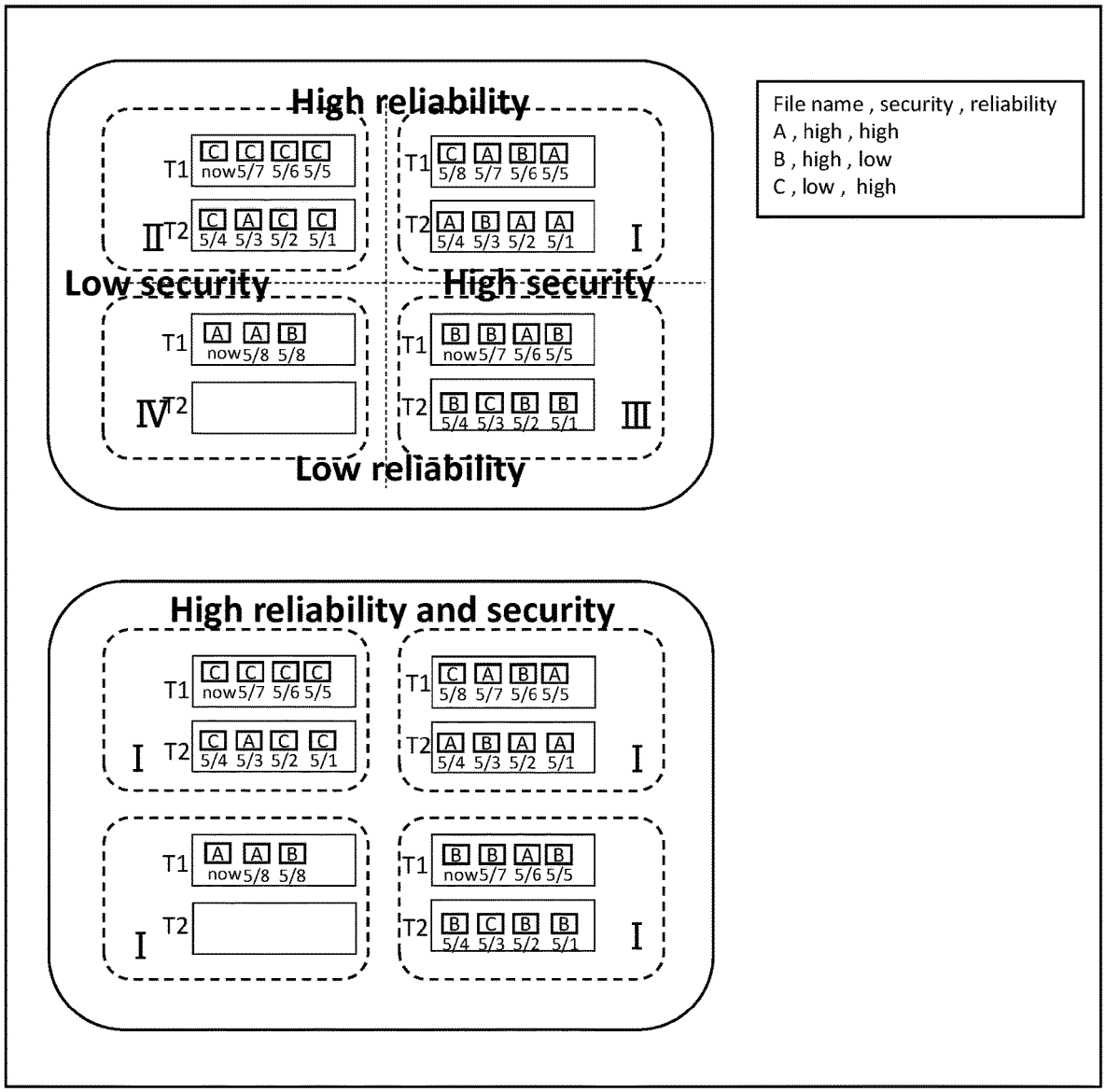
FIG. 11 is a diagram showing an example of a storage state of a file in a general storage system.
Figure 12:
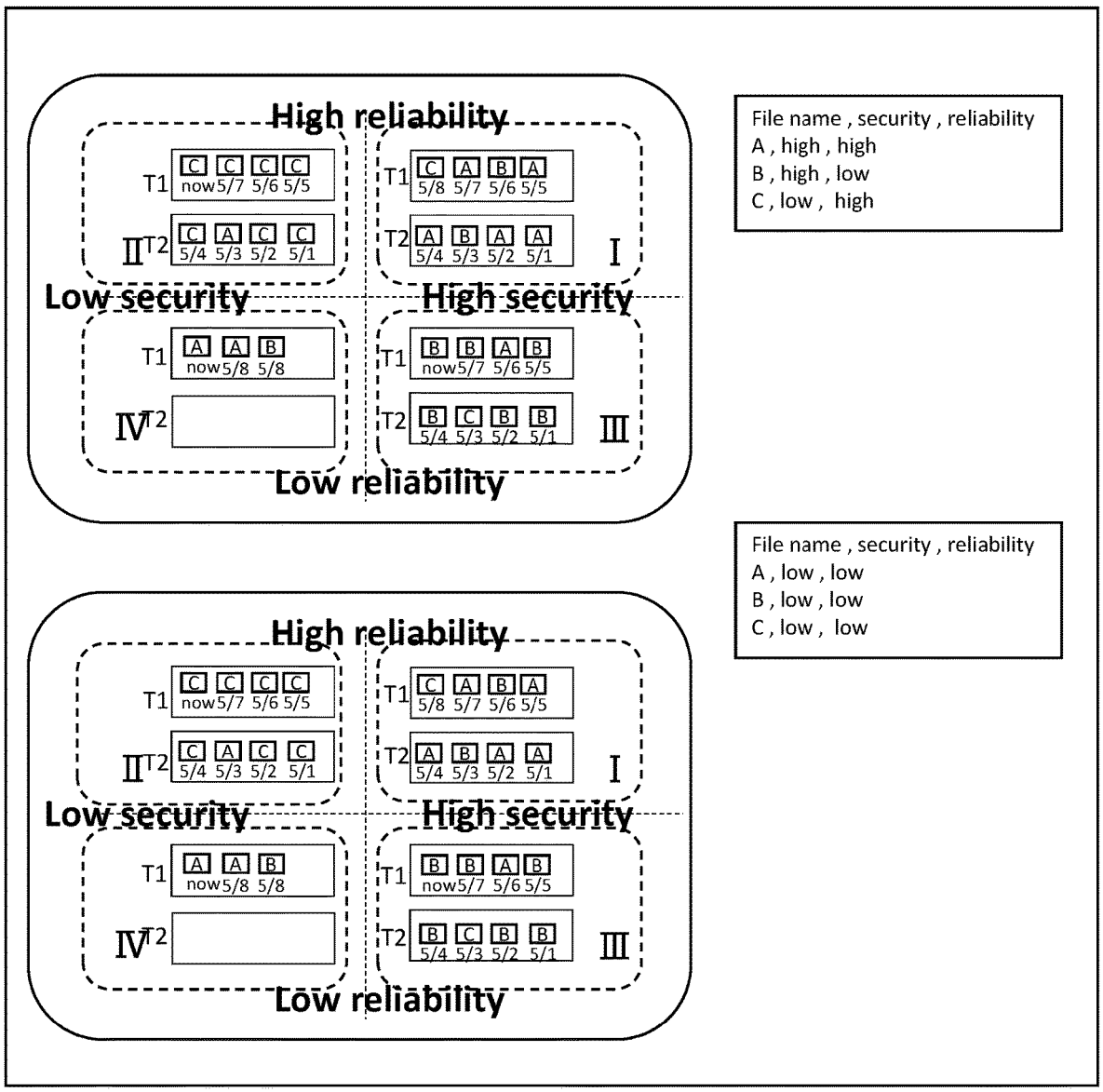
FIG. 12 is a diagram showing another example of a storage state of a file in a general storage system.

FIGS. 11 and 12 are diagrams showing an example of a storage state of a file in a general storage system.

When pieces of data (files) of which a reliability requirement and a security requirement differ from each other are to be stored in physical storage devices of which reliability and security levels differ from each other (as shown as an example in a top-right diagram in FIG. 11), storing the files in physical storage devices without taking the reliability requirements and the security requirements of the file into consideration may cause a file A with a high reliability requirement and a high security requirement to be stored in a physical storage device with low reliability and low security as shown in a top diagram in FIG. 11.

In order to avoid such a situation, as shown in a bottom diagram in FIG. 11, all physical storage devices need only have (high) reliability and a (high) security level so that the physical storage devices are to be classified as classification I. However, requiring all physical storage devices to have high reliability and a high security level ends up increasing an infrastructure cost of the storage system.

On the other hand, as shown in FIG. 12, when physical storage devices classified as classifications I to IV are respectively present, no problems arise when only storing data that can be stored without incident in a physical storage device with (low) reliability and a (low) security level which is classified as classification IV as an entire storage system. However, this means that such a storage system can only store data with a low reliability requirement and a low security requirement.

As described above, in the storage system 1 according to the present embodiment, a total of eight tiers are provided according to a reliability and a "high" or "low" security level of a physical storage device in addition to the tiers (T1 and T2) provided according to cost and performance characteristics and files are to be arranged or rearranged using the eight tiers. Accordingly, the storage system 1 which is capable of selectively using cost, performance, reliability, and security characteristics of physical storage devices in an appropriate manner is realized.

Figure 13:
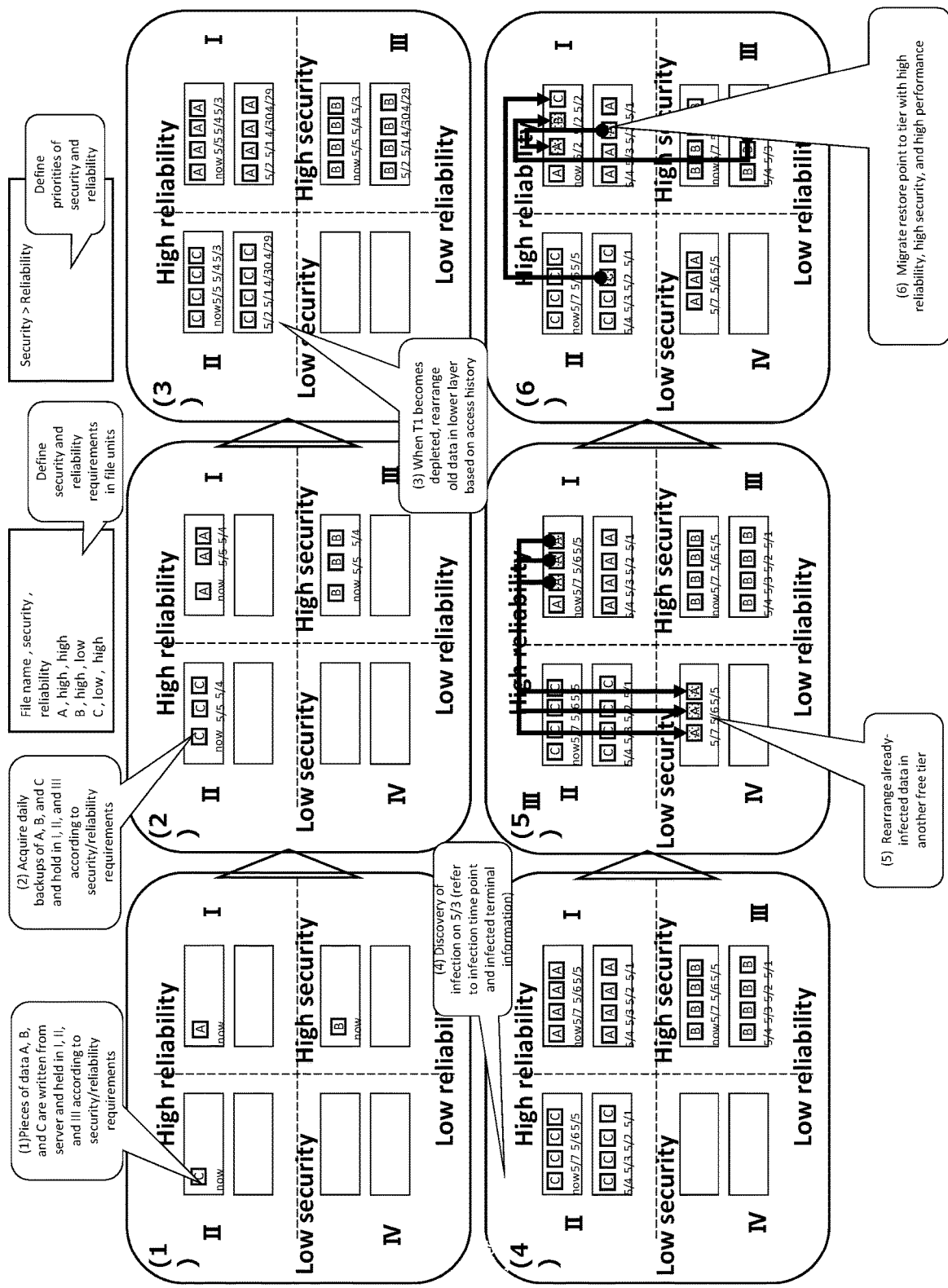
FIG. 13 is a diagram for explaining an overview of operations of the storage system according to the embodiment.

FIG. 13 is a diagram for explaining an overview of operations of the storage system 1 according to the embodiment.

As shown in (1) in FIG. 13, when pieces of data A, B, and C are written to the storage system 1 (the storage apparatus 100*a*) from the server A 400, the pieces of data A, B, and C are stored in the storage apparatuses 100*a* to 100*c* to be classified as any of classifications I to IV on the basis of reliability requirements and security requirements of the pieces of data. In doing so, since the storage apparatuses 100*a* to 100*c* have free capacity, the pieces of data A, B, and C are stored in the tier T1 as a general rule.

Next, as shown in (2) in FIG. 13, backup data of the pieces of data A, B, and C is acquired in response to an instruction from the user of the server A 400 or on a regular basis. The backup data is also stored in the storage apparatuses 100*a* to 100*c* to be classified as any of classifications I to IV on the basis of reliability requirements and security requirements of the backup data.

In the course of storing pieces of data in the storage apparatuses 100*a* to 100*c* having been appropriately classified as classifications I to IV (and preferentially in the tier T1 as described above), the free capacity of the tier T1 becomes depleted as shown in (3) in FIG. 13. Since an object of the storage system 1 according to the present embodiment is to arrange as many pieces of latest data as possible in classification I (and tier T1), the storage system 1 refers to the access history table 115 and rearranges pieces of data of which an access date and time are old in a low-level tier (in the present embodiment, the tier T2).

At this point, as shown in (4) in FIG. 13, it is discovered that the server A 400 had been infected with malware on a given date and time (5/3 is assumed in FIG. 13). The storage apparatus 100*a* refers to the infection information table 117 to identify an infection time point and an infected terminal.

Therefore, as shown in (5) in FIG. 13, the storage apparatus 100*a* identifies data that is already infected (infected with the malware) and rearranges the infected data to another vacant tier.

Furthermore, as shown in (6) in FIG. 13, the storage apparatus 100*a* migrates a restore point (a piece of data with oldest access date/time among the pieces of data not infected with the malware) to classification I with high reliability and a high security level and to the high-performance tier T1.

Next, operations of the storage system 1 according to the present embodiment will be explained with reference to the flow charts shown in FIGS. 14 to 25.

Figure 14:
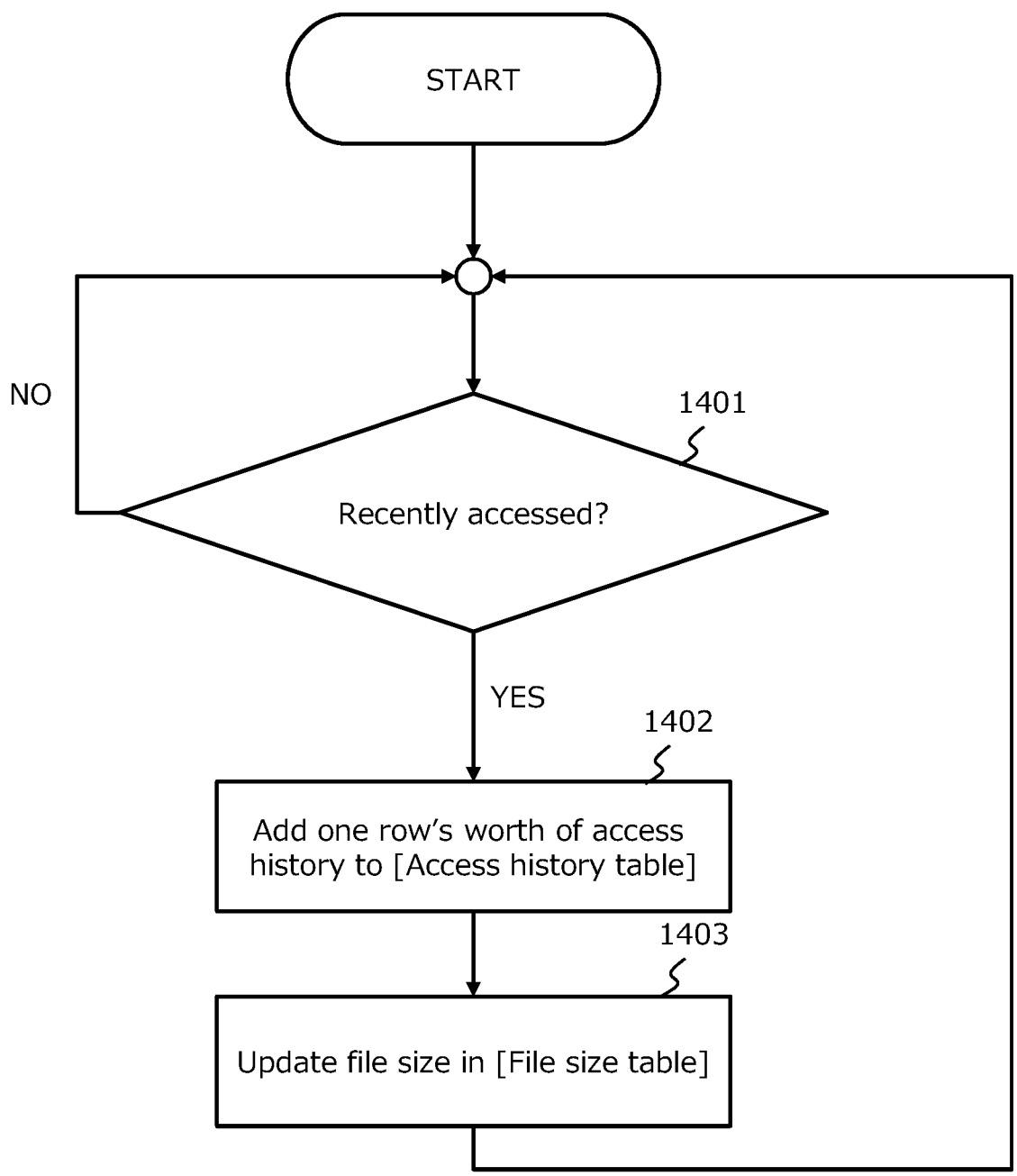
FIG. 14 is a flow chart for explaining an example of an operation of an access history table update processing unit of the storage system according to the embodiment.

FIG. 14 is a flow chart for explaining an example of an operation of the access history table update processing unit 103 of the storage system 1 according to the embodiment.

The access history table update processing unit 103 waits for the server A 400 to access the storage apparatuses 100*a* to 100*c* (1401), and when an access is made (YES in 1401), the access history table update processing unit 103 adds one row's worth of access history to the access history table 115 (1402) and further updates a file size of the file size table 116 (1403).

Figure 15:
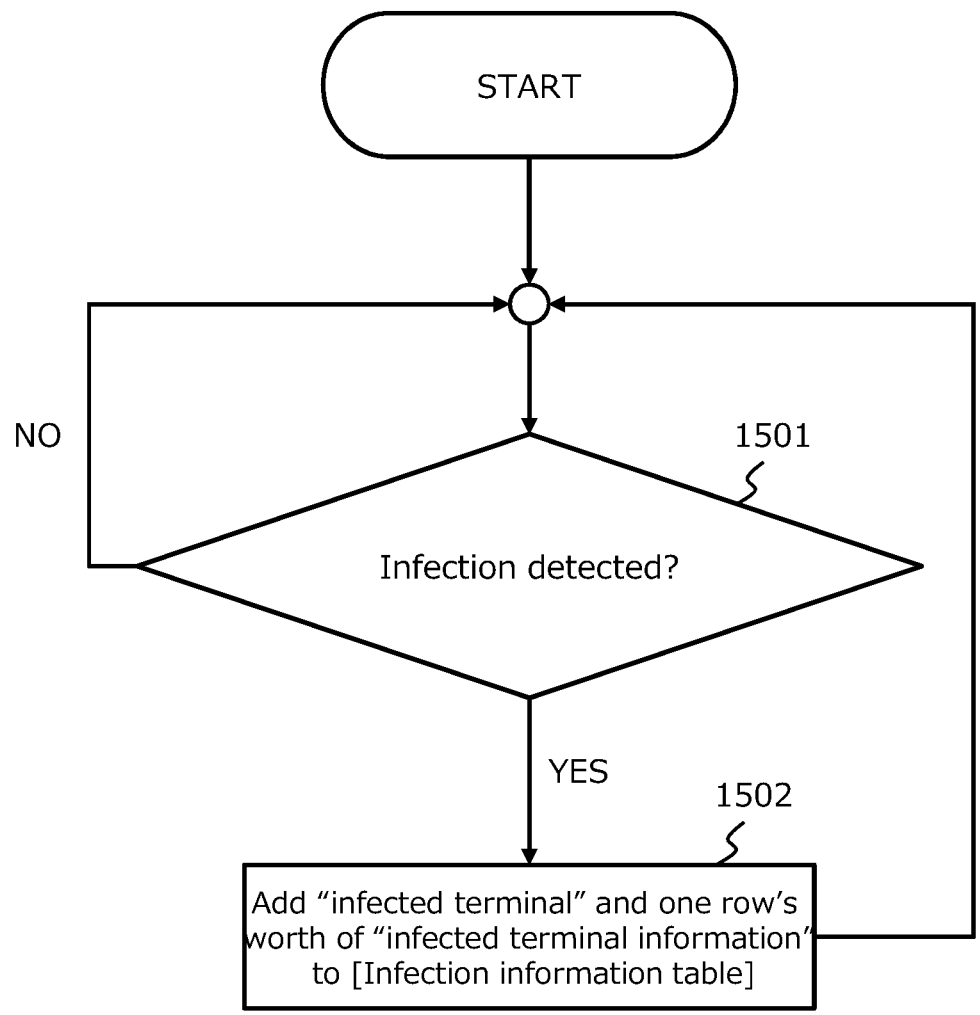
FIG. 15 is a flow chart for explaining an example of an operation of an infection information table update processing unit of the storage system according to the embodiment.

Next, FIG. 15 is a flow chart for explaining an example of an operation of the infection information table update processing unit 104 of the storage system 1 according to the embodiment.

The infection information table update processing unit 104 waits for the infection detecting unit 501 of the security monitoring server 500 to report a detection of an infection with malware (1501), and when a report of a detection of an infection with malware is received (YES in 1501), the infection information table update processing unit 104 adds an infected terminal and one row's worth of infected terminal information to the infection information table 117 (1502).

Figure 16:
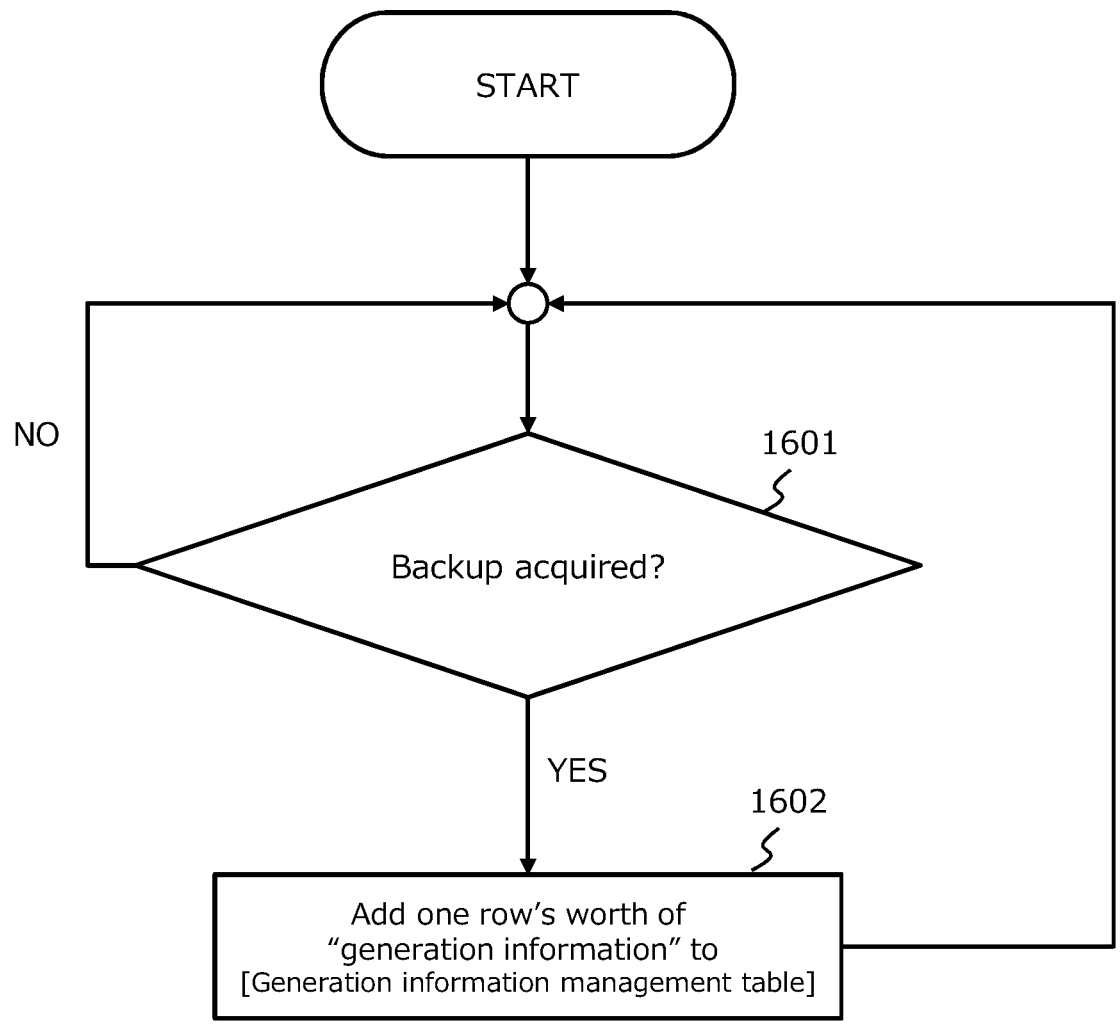
FIG. 16 is a flow chart for explaining an example of an operation of a generation information management table update processing unit of the storage system according to the embodiment.

FIG. 16 is a flow chart for explaining an example of an operation of the generation information management table update processing unit 105 of the storage system 1 according to the embodiment.

The generation information management table update processing unit 105 waits for a backup acquisition operation by the backup acquisition processing unit 102 (1601), and when a backup acquisition operation is performed by the backup acquisition processing unit 102 (YES in 1601), the generation information management table update processing unit 105 adds one row's worth of generation information to the generation information management table 118 (1602).

Figure 17:
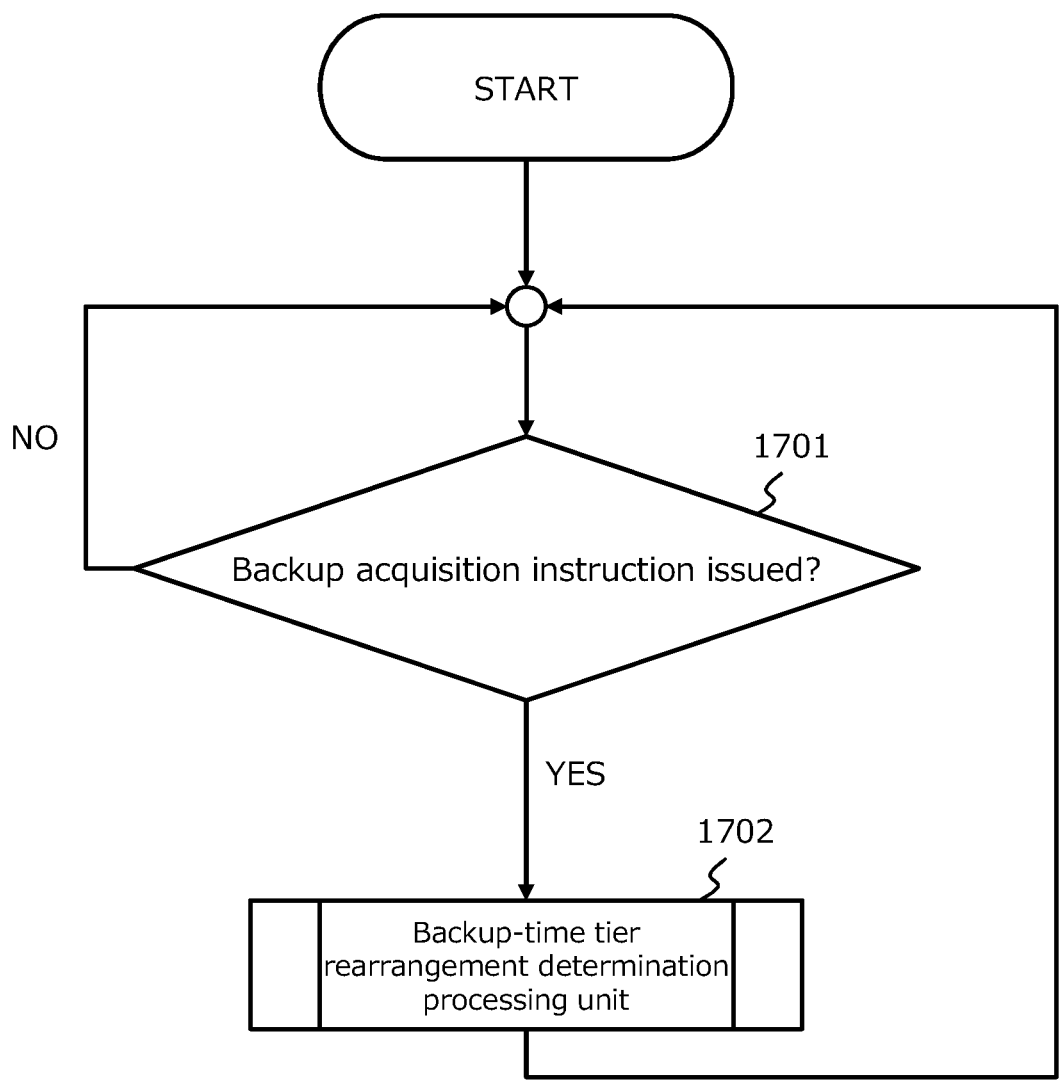
FIG. 17 is a flow chart for explaining an example of a backup acquisition processing operation of the storage system according to the embodiment.

FIG. 17 is a flow chart for explaining an example of an operation by the backup acquisition processing unit 102 of the storage system 1 according to the embodiment.

The backup acquisition processing unit 102 waits for the user of the server A 400 to issue a backup acquisition instruction (1701), and when a backup acquisition instruction is issued (YES in 1701), the backup acquisition processing unit 102 causes the backup-time tier rearrangement determination processing unit 113 to perform a tier rearrangement operation (1702). Details of the operation by the backup-time tier rearrangement determination processing unit 113 will be provided later with reference to FIG. 24.

Figure 18:
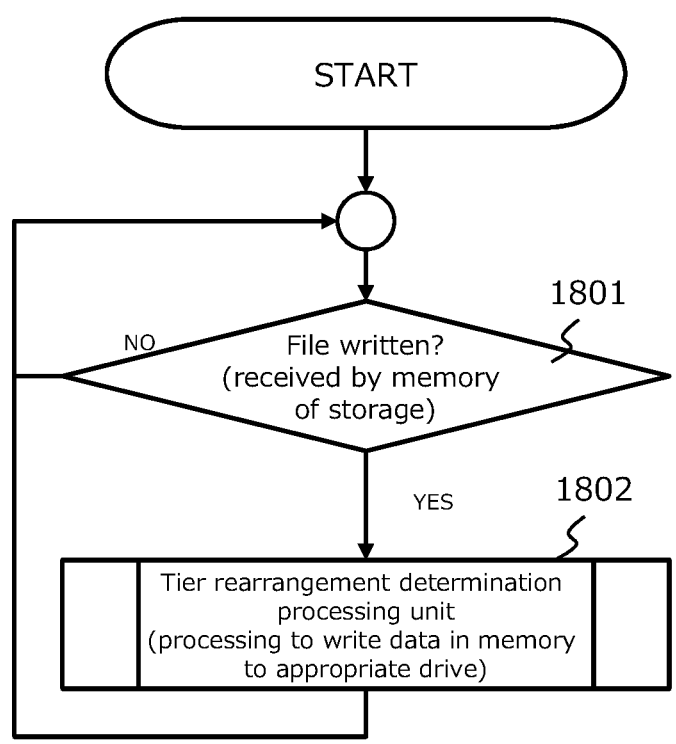
FIG. 18 is a flow chart for explaining an example of a data write processing operation of the storage system according to the embodiment.

FIG. 18 is a flow chart for explaining an example of an operation of the data write processing unit 101 of the storage system 1 according to the embodiment.

The data write processing unit 101 waits for the user of the server A 400 to write a file to a memory (not illustrated) of the storage apparatus 100*a* (1801), and when a file is written to the memory (YES in 1801), the data write processing unit 101 causes the tier rearrangement determination processing unit 106 to perform processing for writing the written file to an appropriate physical storage device. Details of the operation by the tier rearrangement determination processing unit 106 will be provided later with reference to FIG. 19.

Figure 19:
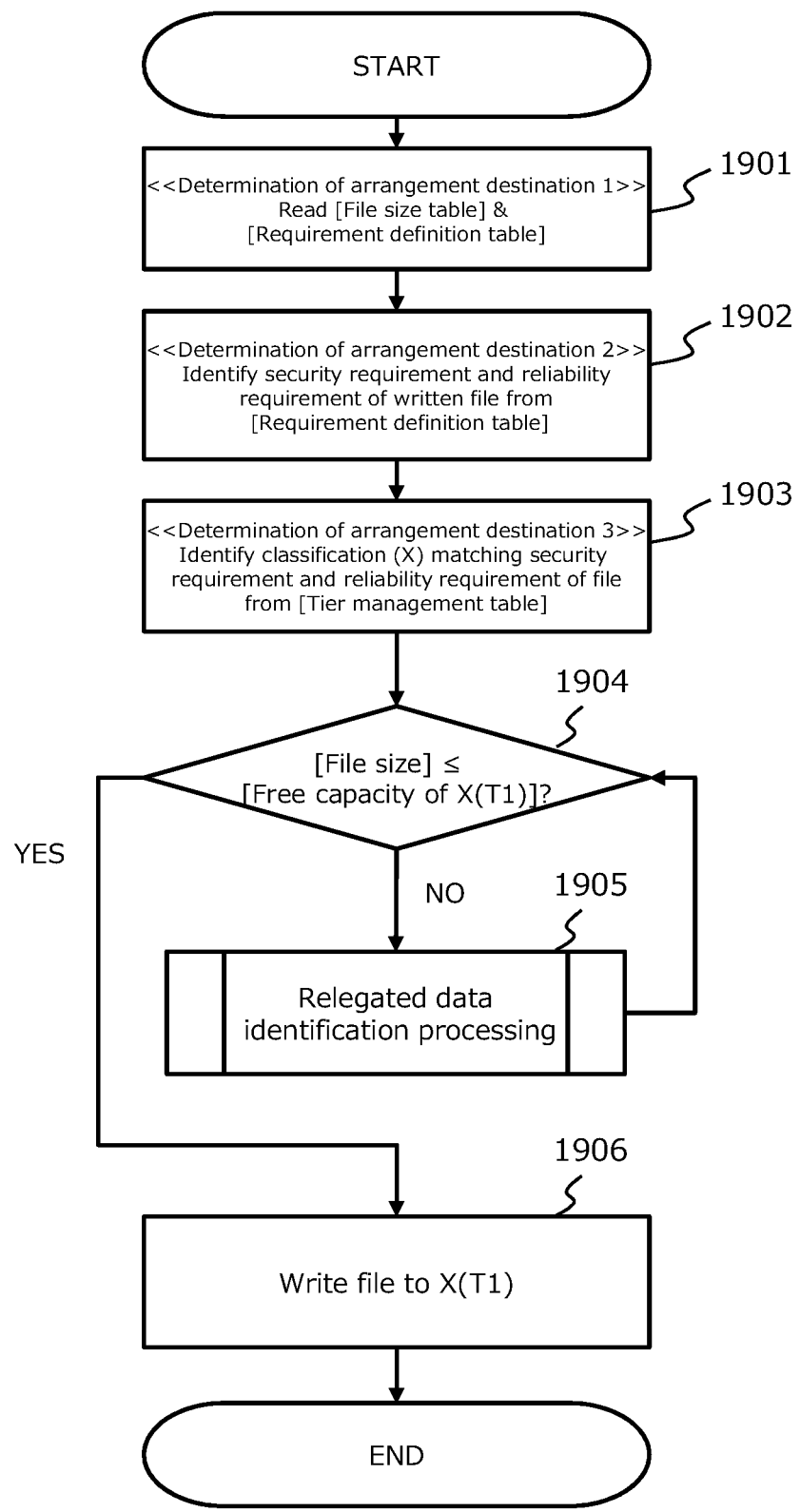
FIG. 19 is a flow chart for explaining an example of an operation of a tier rearrangement determination processing unit of the storage system according to the embodiment.

FIG. 19 is a flow chart for explaining an example of an operation of the tier rearrangement determination processing unit 106 of the storage system 1 according to the embodiment.

First, the tier rearrangement determination processing unit 106 reads the file size table 116 and the requirement definition table 108 (1901). Next, the tier rearrangement determination processing unit 106 identifies a security requirement and a reliability requirement of a file written to the memory of the storage apparatus 100*a* from the requirement definition table 108 (1902). Furthermore, the tier rearrangement determination processing unit 106 identifies a classification (to be denoted by X) matching the security requirement and the reliability requirement of the file identified in 1902 from the tier management table 110 (1903).

In addition, the tier rearrangement determination processing unit 106 refers to the file size table 116 using a file name as a key to identify a file size of the file written to the memory and determines whether or not the file size is equal to or smaller than a free capacity of the tier T1 of classification X (hereinafter, the tier T1 of classification X will be expressed as X(T1)) (1904). As a result, when the file size is determined to be equal to or smaller than the free capacity of X(T1) (YES in 1904), the tier rearrangement determination processing unit 106 advances to 1906, but when the file size is determined to exceed the free capacity of X(T1) (NO in 1904), the tier rearrangement determination processing unit 106 causes the relegated data identification processing unit 107 to perform write processing of the file to an appropriate classification and tier. Details of the operation by the relegated data identification processing unit 107 will be provided later with reference to FIG. 20.

Figure 20:
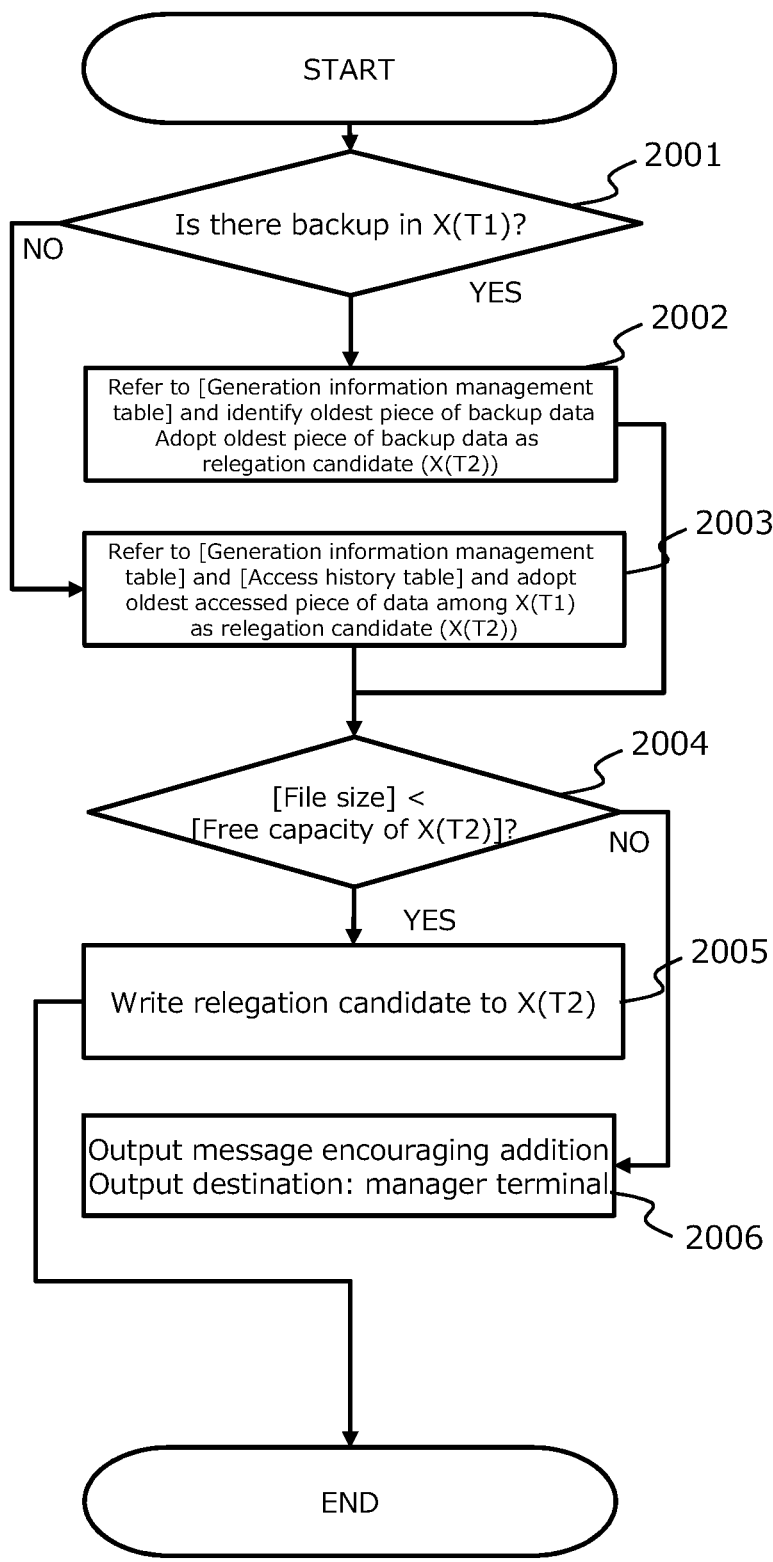
FIG. 20 is a flow chart for explaining an example of an operation of a relegated data identification processing unit of the storage system according to the embodiment.

FIG. 20 is a flow chart for explaining an example of an operation of the relegated data identification processing unit 107 of the storage system 1 according to the embodiment.

The relegated data identification processing unit 107 first refers to the generation information management table 118 using a target classification/tier (X(T1)) as a key to determine whether or not backup data is present in the target classification/tier (X(T1)) (2001).

As a result, when it is determined that backup data is present in the target classification/tier (YES in 2001), the relegated data identification processing unit 107 refers to the generation information management table 118 to identify an oldest piece of backup data and adopts the identified backup data as a relegation candidate (X(T2)) (2002).

On the other hand, when it is determined that backup data is not present in the target classification/tier (NO in 2002), the relegated data identification processing unit 107 refers to the generation information management table 118 and the access history table 115 to adopt a piece of data of which a date and time of access are oldest among the pieces of data stored in the target classification/tier (X(T1)) as the relegation candidate (X(T2)) (2003).

Next, the relegated data identification processing unit 107 determines whether or not a free capacity of the relegation candidate (X(T2)) exceeds a file size of a file to be written (2004). As a result, when it is determined that the free capacity of the relegation candidate (X(T2)) exceeds the file size of the file to be written (YES in 2004), the relegated data identification processing unit 107 writes the data being the relegation candidate to the classification/tier (X(T2)) (2005). On the other hand, when it is determined that the free capacity of the relegation candidate (X(T2)) is equal to or smaller than the file size of the file to be written (NO in 2004), the relegated data identification processing unit 107 outputs a message encouraging a manager terminal (not illustrated) of the storage apparatus 100a to add physical storage devices (2006).

Figure 21:
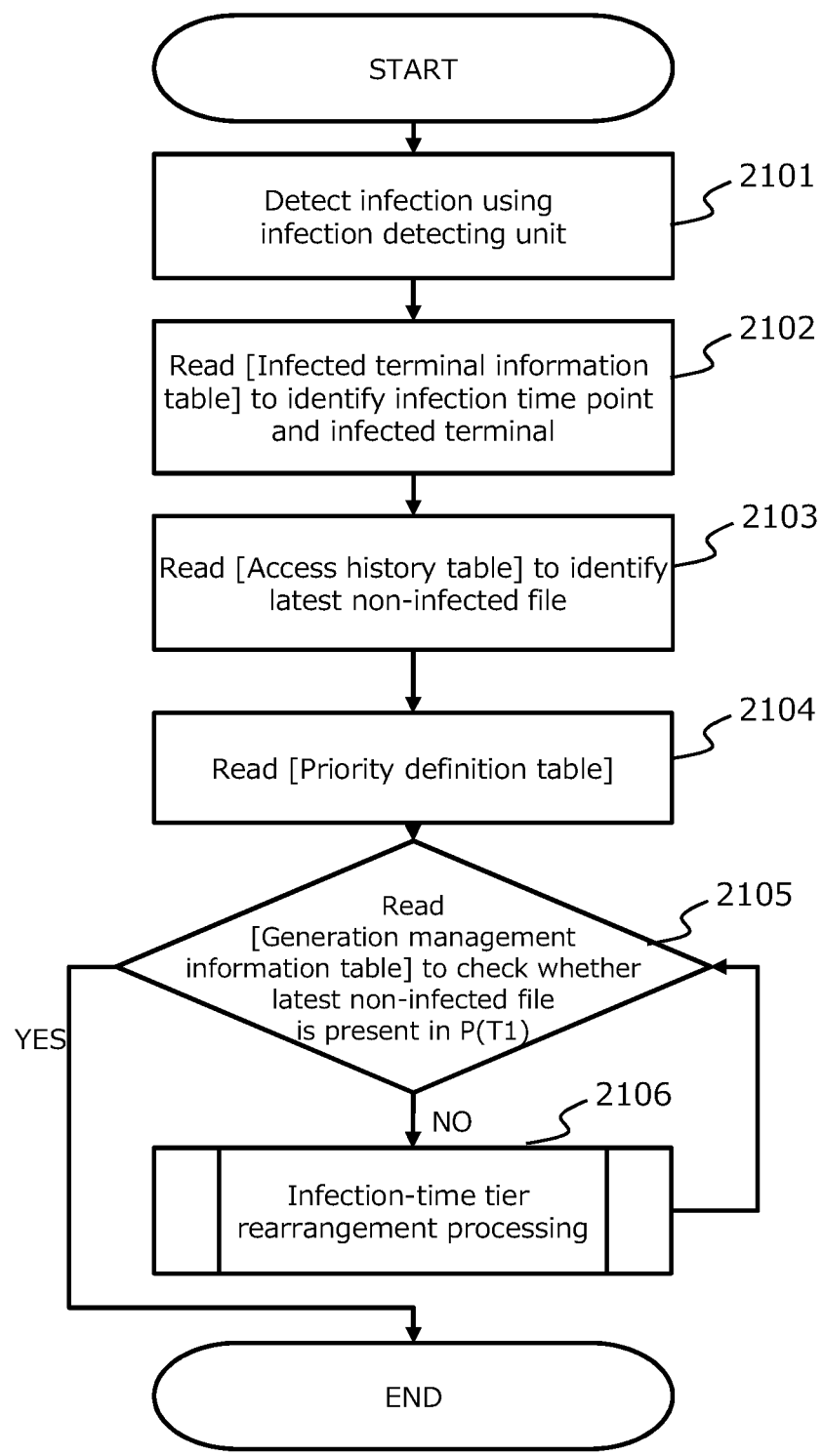
FIG. 21 is a flow chart for explaining an example of a non-infected data identification processing operation of the storage system according to the embodiment.

FIG. 21 is a flow chart for explaining an example of a non-infected data identification processing operation of the storage system 1 according to the embodiment.

First, when the infection detecting unit 501 of the security monitoring server 500 detects an infection with malware (2101), the data write processing unit 101 reads the infection information table 117 to identify an infection time point and an infected terminal (2102).

Next, the data write processing unit 101 reads the access history table 115 to identify a latest non-infected file (in other words, a file which has an access date and time that precedes the infection time point and which can be determined not to be infected with malware) (2103). In addition, the data write processing unit 101 reads the priority definition table 109 (2104).

Furthermore, the data write processing unit 101 reads the generation information management table 118 to determine whether or not the latest non-infected data is present in P(T1) being a target classification/tier (2105). At this point, as indicated in the priority definition table 109 shown in FIG. 4, in the present embodiment, the target classification/tier P(T1) is I(T1).

As a result, when it is determined that the latest non-infected data is present in I(T1) being a target classification/tier (YES in 2105), a program shown in FIG. 21 is ended. In other words, a determination is made that there is no need to migrate the classification/tier where the latest non-infected data is being stored. On the other hand, when it is determined that the latest non-infected data is not present in I(T1) being the target classification/tier (NO in 2105), migration processing of the classification/tier of the file is performed by the infection-time tier rearrangement determination processing unit 111 (2106). Details of the operation by the infection-time tier rearrangement determination processing unit 111 will be provided later with reference to FIG. 22.

Figure 22:
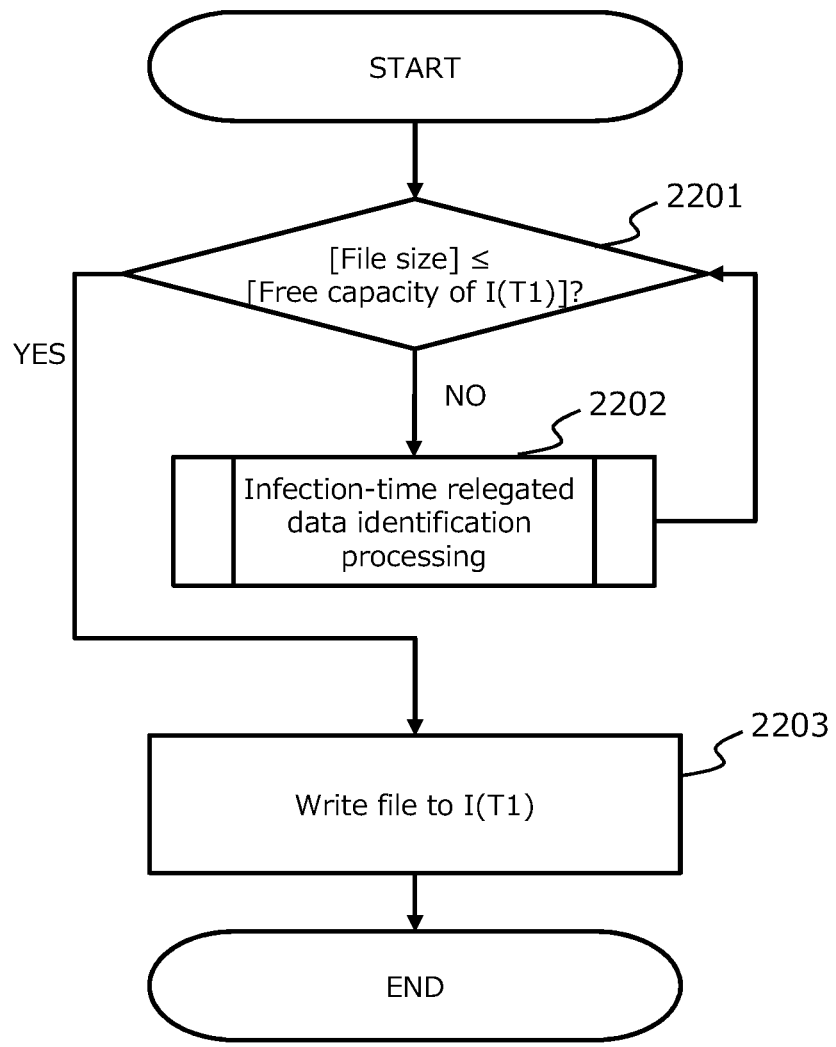
FIG. 22 is a flow chart for explaining an example of an operation of an infection-time tier rearrangement processing unit of the storage system according to the embodiment.

FIG. 22 is a flow chart for explaining an example of an operation of the infection-time tier rearrangement determination processing unit 111 of the storage system 1 according to the embodiment.

The infection-time tier rearrangement determination processing unit 111 refers to the file size table 116 using a file name of a file to be a target as a key to determine whether or not the file size of the file to be a target is equal to or smaller than a free capacity of the classification/tier I(P1) (2201). As a result, when the file size is determined to be equal to or smaller than the free capacity of classification/tier I(P1) (YES in 2201), the infection-time tier rearrangement determination processing unit 111 writes the file to the classification/tier I(P1) (2203), but when the file size is determined to exceed the free capacity of classification/tier I(P1) (NO in 2201), the infection-time tier rearrangement determination processing unit 111 causes the infection-time relegated data identification processing unit 112 to perform migration processing of the classification/tier of the file (2006). Details of the operation by the infection-time relegated data identification processing unit 112 will be provided later with reference to FIG. 23.

Figure 23:
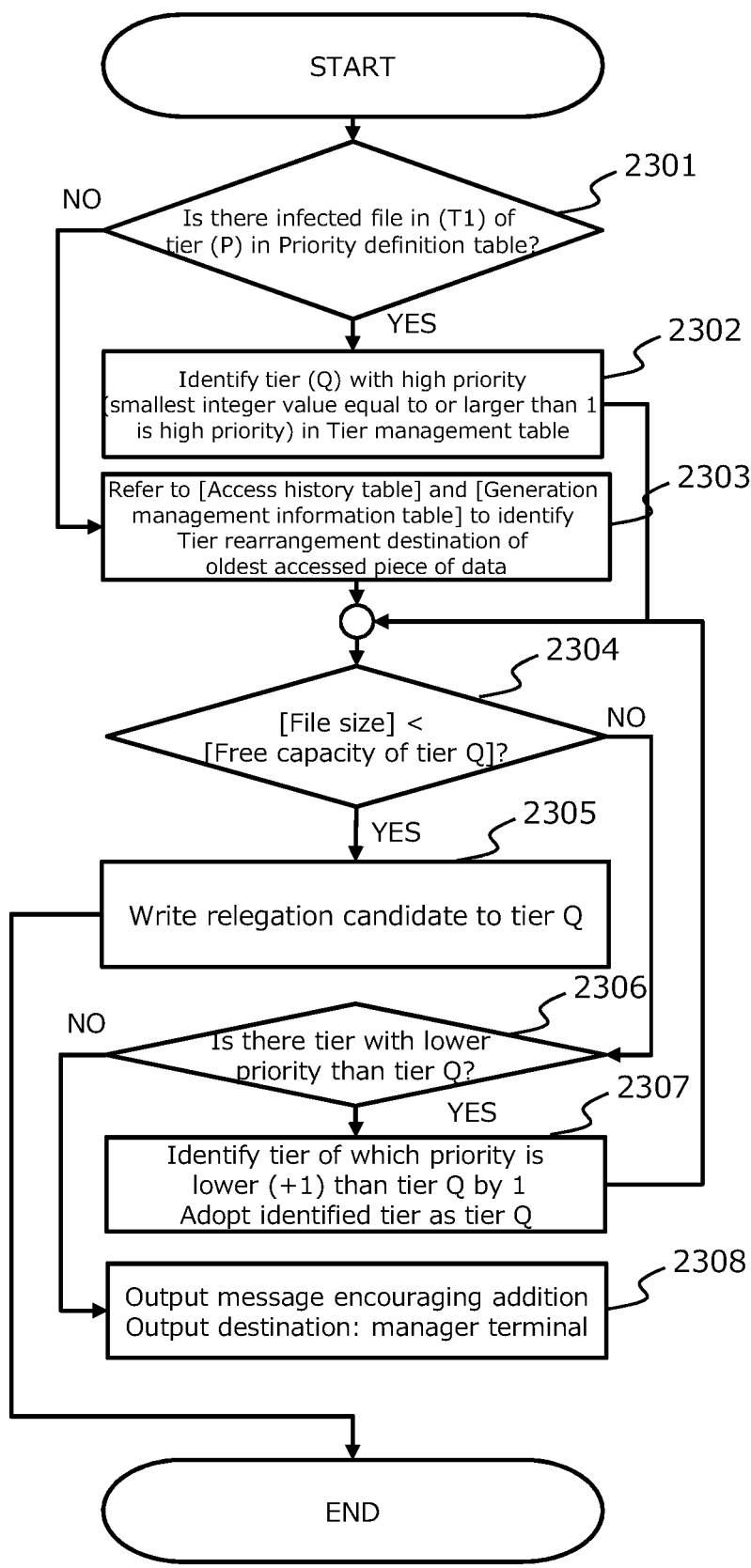
FIG. 23 is a flow chart for explaining an example of an operation of an infection-time relegated data identification processing unit of the storage system according to the embodiment.

FIG. 23 is a flow chart for explaining an example of an operation of the infection-time relegated data identification processing unit 112 of the storage system 1 according to the embodiment.

First, the infection-time relegated data identification processing unit 112 refers to the priority definition table 109 to determine whether or not an infected file is present in the tier T1 of a classification P (as indicated in the priority definition table 109 shown in FIG. 4, the classification P in this case is a classification I) described in the priority definition table 109 (2301).

As a result, when it is determined that an infected file is present in the tier T1 that is classification I (YES in 2301), the infection-time relegated data identification processing unit 112 refers to the tier management table 110 and identifies a tier Q having a high priority (a tier having a priority that is a smallest integer value equal to or larger than 1 is considered high priority) (2302).

On the other hand, when it is determined that an infected file is not present in the tier T1 that is classification I (NO in 2301), the infection-time relegated data identification processing unit 112 refers to the access history table 115 and the generation information management table 118 to identify a tier rearrangement destination with respect to an oldest accessed piece of data (2303). The tier rearrangement destination in 2303 is assumed to be the tier Q with high priority in the tier management table 110.

Next, the infection-time relegated data identification processing unit 112 refers to the file size table 116 using a file name as a key to determine whether or not the file size of a file to be a target is smaller than a free capacity of the tier Q (2304). As a result, when it is determined that the file size of the file is smaller than the free capacity of the tier Q (YES in 2304), the infection-time relegated data identification processing unit 112 writes the file to be a target (in other words, a relegation candidate) to the tier Q (2305).

On the other hand, when it is determined that the file size of the file is equal to or larger than the free capacity of the tier Q (NO in 2304), the infection-time relegated data identification processing unit 112 further determines whether or not there is a tier of which a priority is lower than that of the tier Q (2306). As a result, when it is determined that there is a tier of which a priority is lower than that of the tier Q (YES in 2306), the infection-time relegated data identification processing unit 112 identifies the tier of which a priority is lower than that of the tier Q (in other words, a tier of which the priority is expressed as priority of tier Q+1) and sets the tier as the tier Q (2307). Subsequently, the program returns to 2304.

On the other hand, when it is determined that there is no tier of which the priority is lower than that of the tier Q (NO in 2306), the infection-time relegated data identification processing unit 112 outputs a message encouraging the manager terminal (not illustrated) of the storage apparatus 100a to add physical storage devices (2308).

Figure 24:
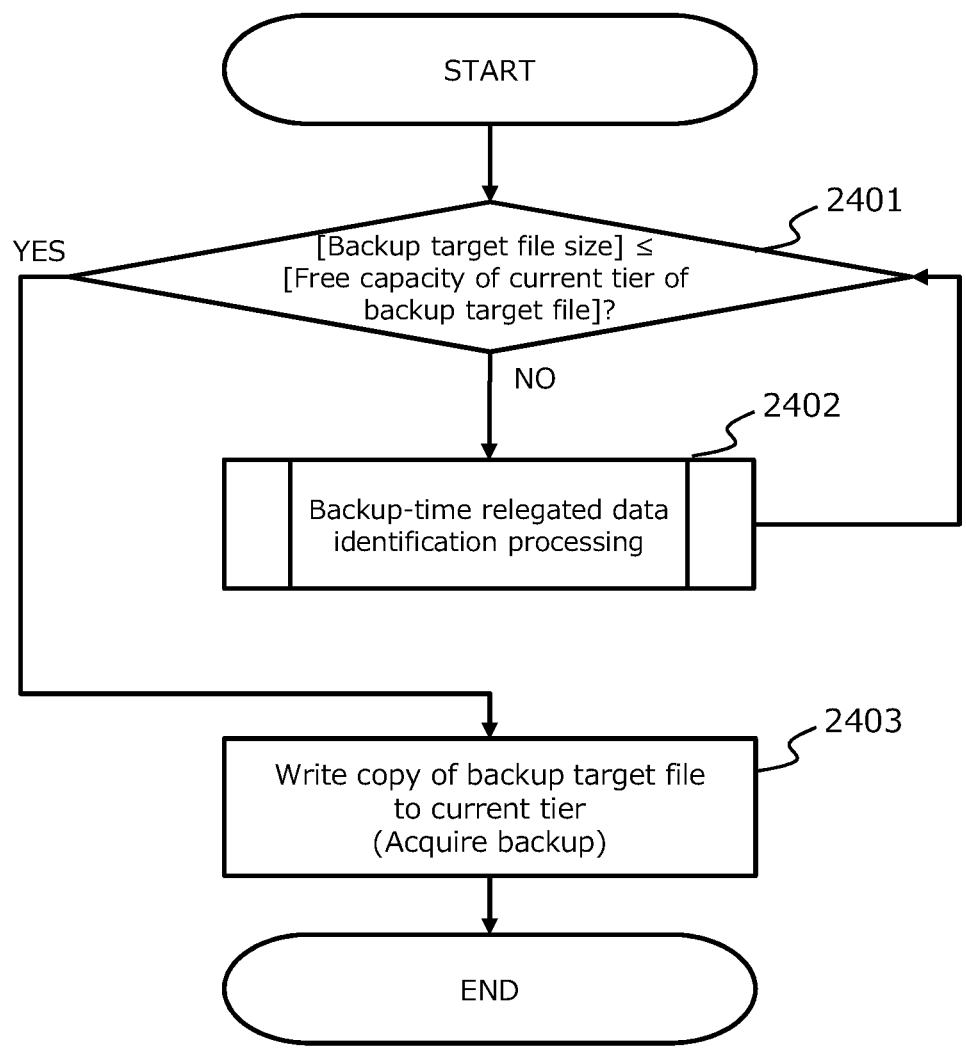
FIG. 24 is a flow chart for explaining an example of an operation of a backup-time tier rearrangement processing unit of the storage system according to the embodiment.

FIG. 24 is a flow chart for explaining an example of an operation of the backup-time tier rearrangement determination processing unit 113 of the storage system 1 according to the embodiment.

The backup-time tier rearrangement determination processing unit 113 refers to the file size table 116 using a file name of a file to be a backup target as a key to determine whether or not the file size of the file to be a backup target is equal to or smaller than a free capacity of a tier in which the file to be a backup target is currently being stored (2401).

As a result, when it is determined that the file size of the file is equal to or smaller than the free capacity of the tier in which the file to be a backup target is currently being stored (YES in 2401), the backup-time tier rearrangement determination processing unit 113 writes a copy of the file that is a backup target to the current tier (2403).

On the other hand, when it is determined that the file size of the file exceeds the free capacity of the tier in which the file to be a backup target is currently being stored (NO in 2401), the backup-time relegated data identification processing unit 114 performs migration processing of a classification/tier of the file (2402). Details of the operation by the backup-time relegated data identification processing unit 114 will be provided later with reference to FIG. 25.

Figure 25:
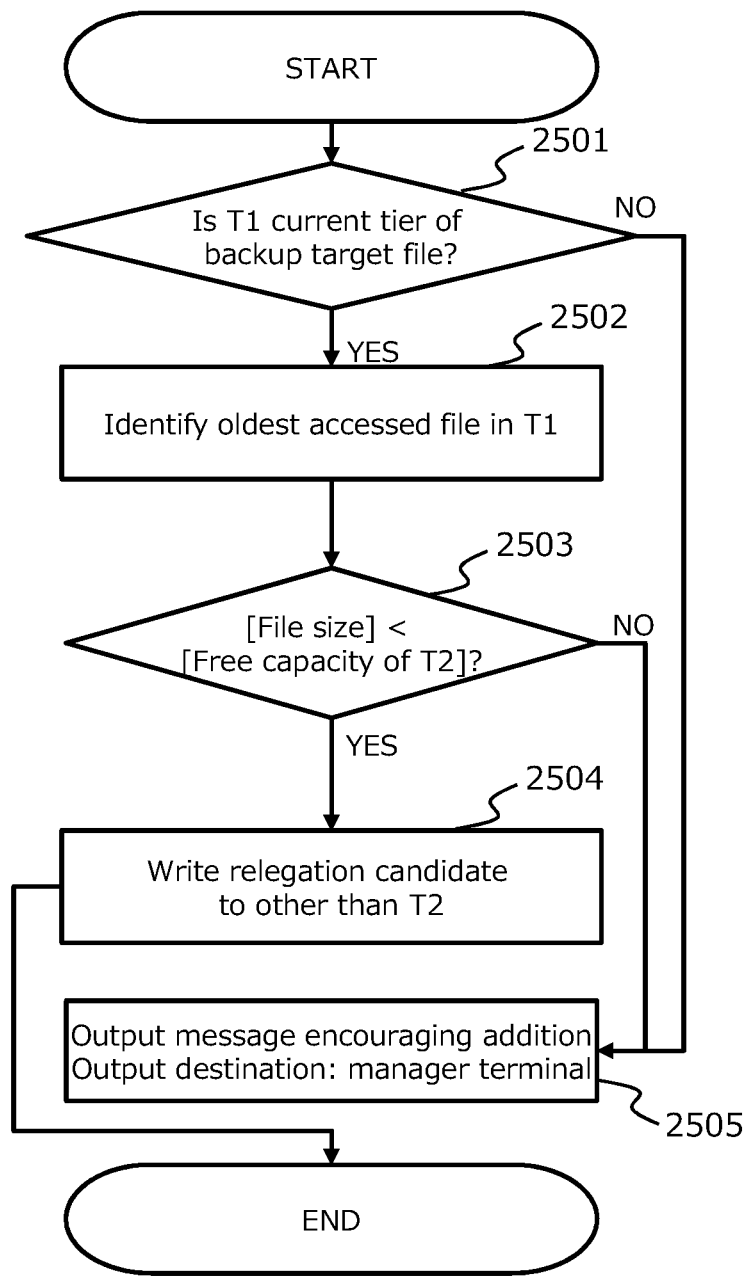
FIG. 25 is a flow chart for explaining an example of an operation of a backup-time relegated data identification processing unit of the storage system according to the embodiment.

FIG. 25 is a flow chart for explaining an example of an operation of the backup-time relegated data identification processing unit of the storage system according to the embodiment.

The backup-time relegated data identification processing unit 114 refers to the generation information management table 118 using a file name of a file to be a backup target as a key to determine whether or not the tier in which the file to be a backup target is currently being stored is T1 (2501). As a result, when it is determined that the tier in which the file to be a backup target is currently being stored is T1 (YES in 2501), the program advances to 2502, but when it is determined that the tier in which the file to be a backup target is currently being stored is not T1 (NO in 2501), the backup-time relegated data identification processing unit 114 outputs a message encouraging the manager terminal (not illustrated) of the storage apparatus 100a to add physical storage devices (2505).

In 2502, the backup-time relegated data identification processing unit 114 identifies a file of which access date and time are oldest among the files stored in tier T1. Next, the backup-time relegated data identification processing unit 114 refers to the file size table 116 using a file name of the file identified in 2502 as a key to determine whether or not the file size of the identified file is smaller than a free capacity of the tier T2 (2503).

As a result, when it is determined that the file size of the file is smaller than the free capacity of the tier T2 (YES in 2503), the backup-time relegated data identification processing unit 114 writes the identified file or, in other words, the file that is a relegation candidate to a tier other than the tier T2 (2504). On the other hand, when it is determined that the file size of the file is equal to or larger than the free capacity of the tier T2 (NO in 2503), the program advances to 2505.

In the storage system 1 according to the present embodiment, the number of the storage apparatuses 100 and the coupling mode of each storage apparatus 100 are not particularly limited. Hereinafter, embodiments regarding the number of the storage apparatuses 100 and the coupling mode of each storage apparatus 100 will be explained with reference to FIGS. 26 to 33.

Figure 26:
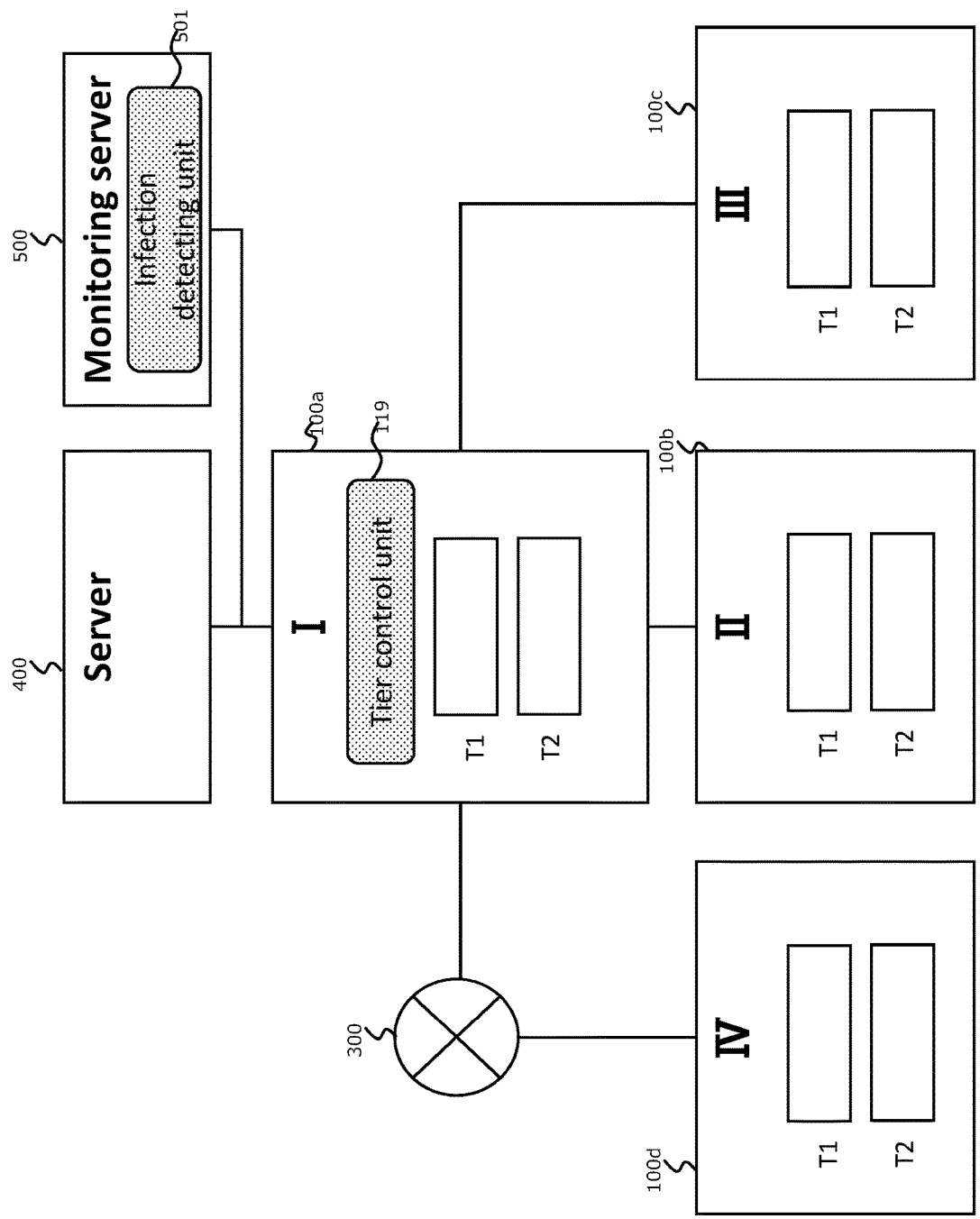
FIG. 26 is a diagram showing an example of a schematic configuration of a storage system according to a first embodiment.

The storage system 1 (first embodiment) shown in FIG. 26 is provided with four storage apparatuses 100a to 100d. In this case, a tier control unit 119 integrates the data write processing unit 101, the backup acquisition processing unit 102, the access history table update processing unit 103, the infection information table update processing unit 104, and the generation information management table update processing unit 105 shown in FIG. 1. The storage apparatuses 100b and 100c are managed at a same location or by a same manager as the storage apparatus 100a and are coupled by communication lines. However, since the communication line coupling the storage apparatus 100a and the storage apparatus 100c to each other is less reliable than the communication line coupling the storage apparatus 100a and the storage apparatus 100b to each other, classification of the storage apparatus 100a is set to I, classification of the storage apparatus 100b is set to II, and classification of the storage apparatus 100c is set to III. In addition, the storage apparatus 100d is coupled to the storage apparatus 100a via the network 300. Therefore, classification of the storage apparatus 100d is set to IV.

Figure 27:
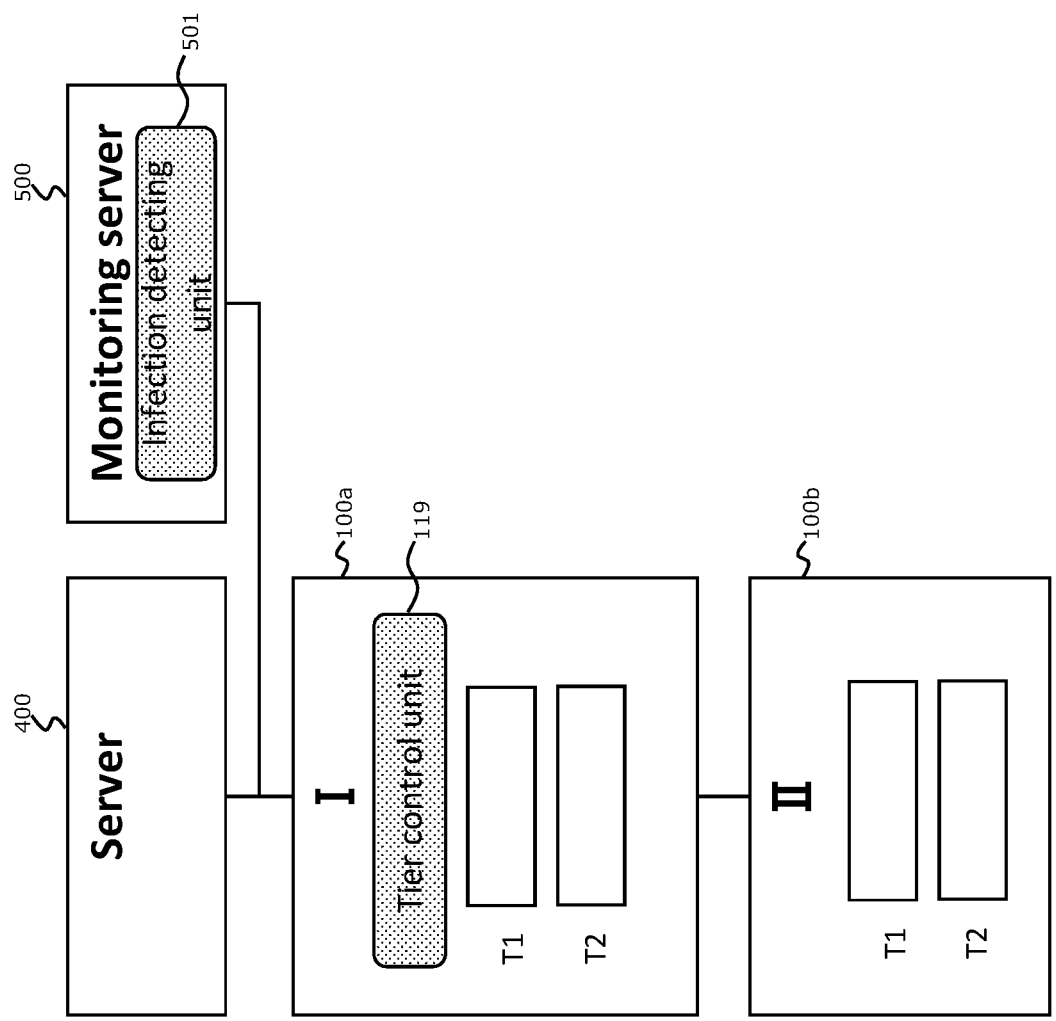
FIG. 27 is a diagram showing an example of a schematic configuration of a storage system according to a second embodiment.

The storage system 1 (second embodiment) shown in FIG. 27 is provided with two storage apparatuses 100a and 100b. The storage apparatus 100b is managed at a same location or by a same manager as the storage apparatus 100a and is coupled by a communication line. Therefore, classification of the storage apparatus 100a is set to I and classification of the storage apparatus 100b is set to II.

Figure 28:
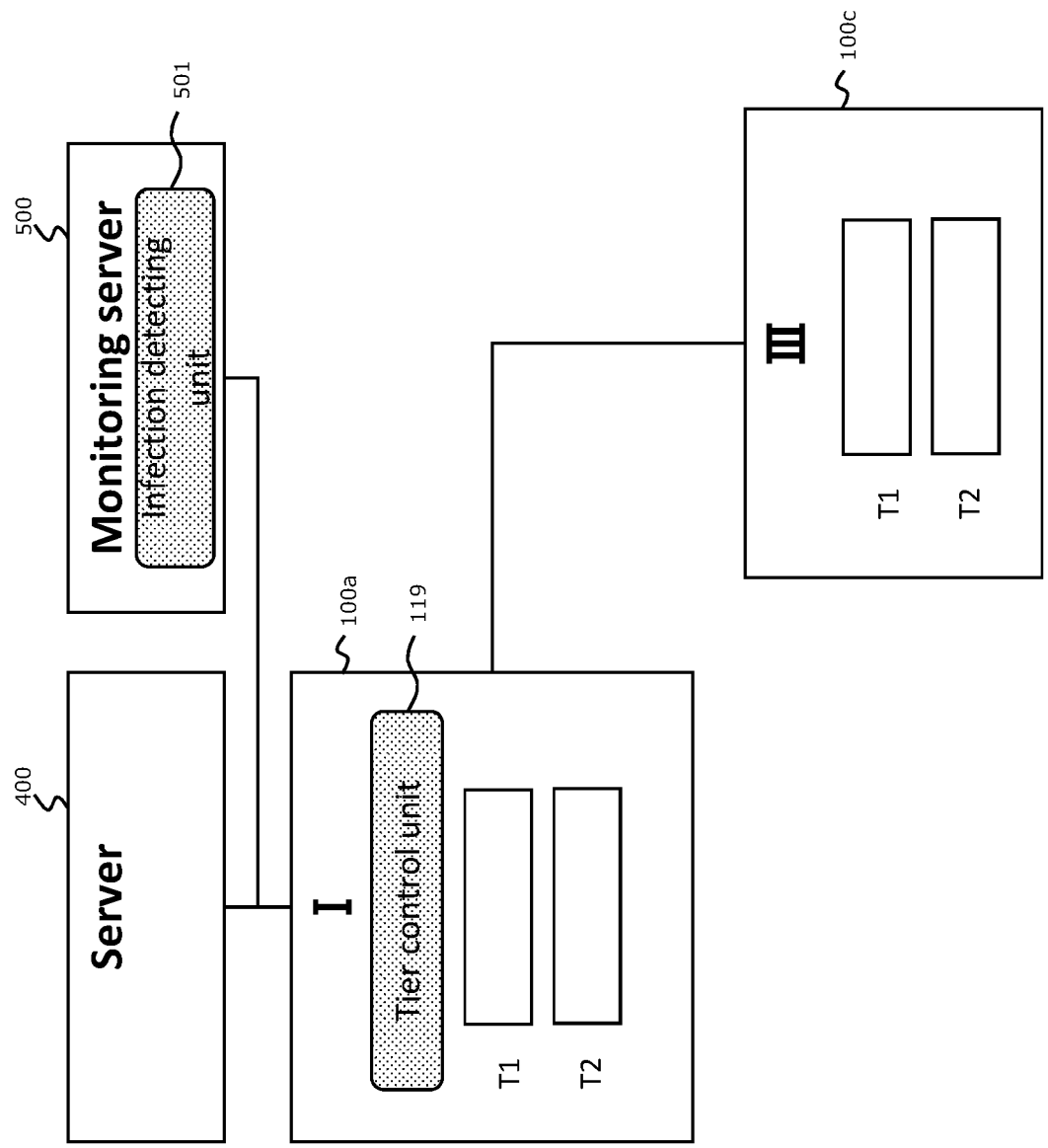
FIG. 28 is a diagram showing an example of a schematic configuration of a storage system according to a third embodiment.

The storage system 1 (third embodiment) shown in FIG. 28 is provided with two storage apparatuses 100a and 100c. The storage apparatus 100c is managed at a same location or by a same manager as the storage apparatus 100a and is coupled by a communication line. Since the communication line coupling the storage apparatus 100a and the storage apparatus 100c to each other is less reliable than the communication line coupling the storage apparatus 100a and the storage apparatus 100b shown in FIG. 27 to each other, classification of the storage apparatus 100a is set to I and classification of the storage apparatus 100c is set to III.

Figure 29:
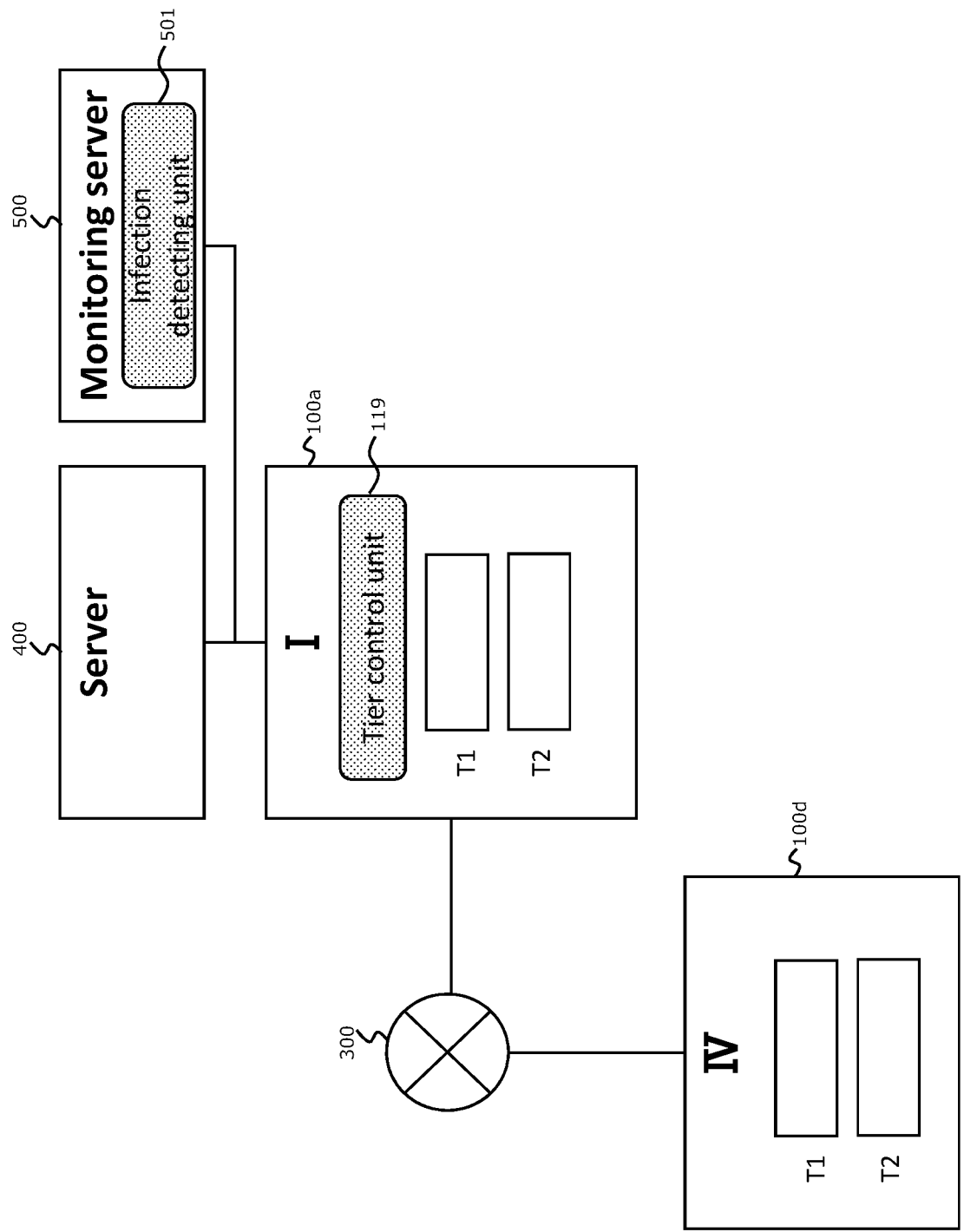
FIG. 29 is a diagram showing an example of a schematic configuration of a storage system according to a fourth embodiment.

The storage system 1 (fourth embodiment) shown in FIG. 29 is provided with two storage apparatuses 100a and 100d. The storage apparatus 100d is coupled to the storage apparatus 100a via the network 300. Therefore, classification of the storage apparatus 100a is set to I and classification of the storage apparatus 100d is set to IV.

Figure 30:
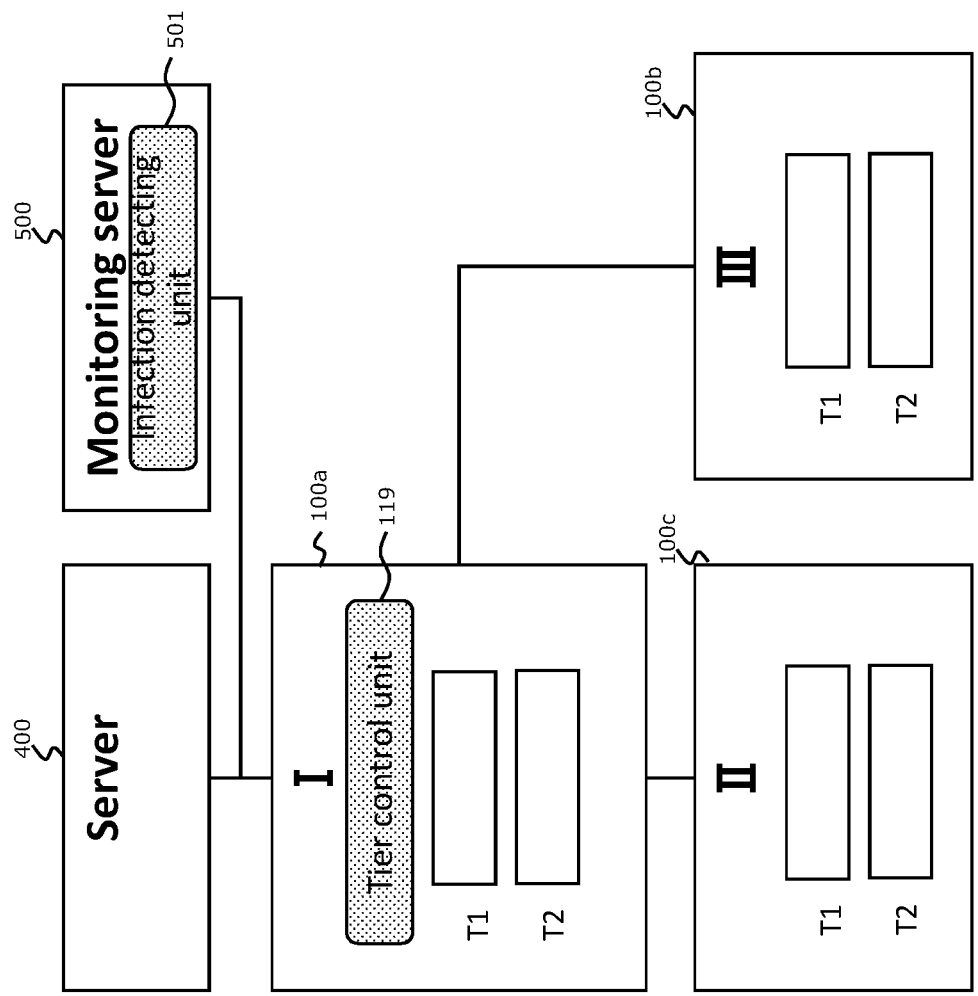
FIG. 30 is a diagram showing an example of a schematic configuration of a storage system according to a fifth embodiment.

The storage system 1 (fifth embodiment) shown in FIG. 30 is provided with three storage apparatuses 100a to 100c. The storage apparatuses 100b and 100c are managed at a same location or by a same manager as the storage apparatus 100a and are coupled by communication lines. However, since the communication line coupling the storage apparatus 100a and the storage apparatus 100c to each other is less reliable than the communication line coupling the storage apparatus 100a and the storage apparatus 100b to each other, classification of the storage apparatus 100a is set to I, classification of the storage apparatus 100b is set to II, and classification of the storage apparatus 100c is set to III.

Figure 31:
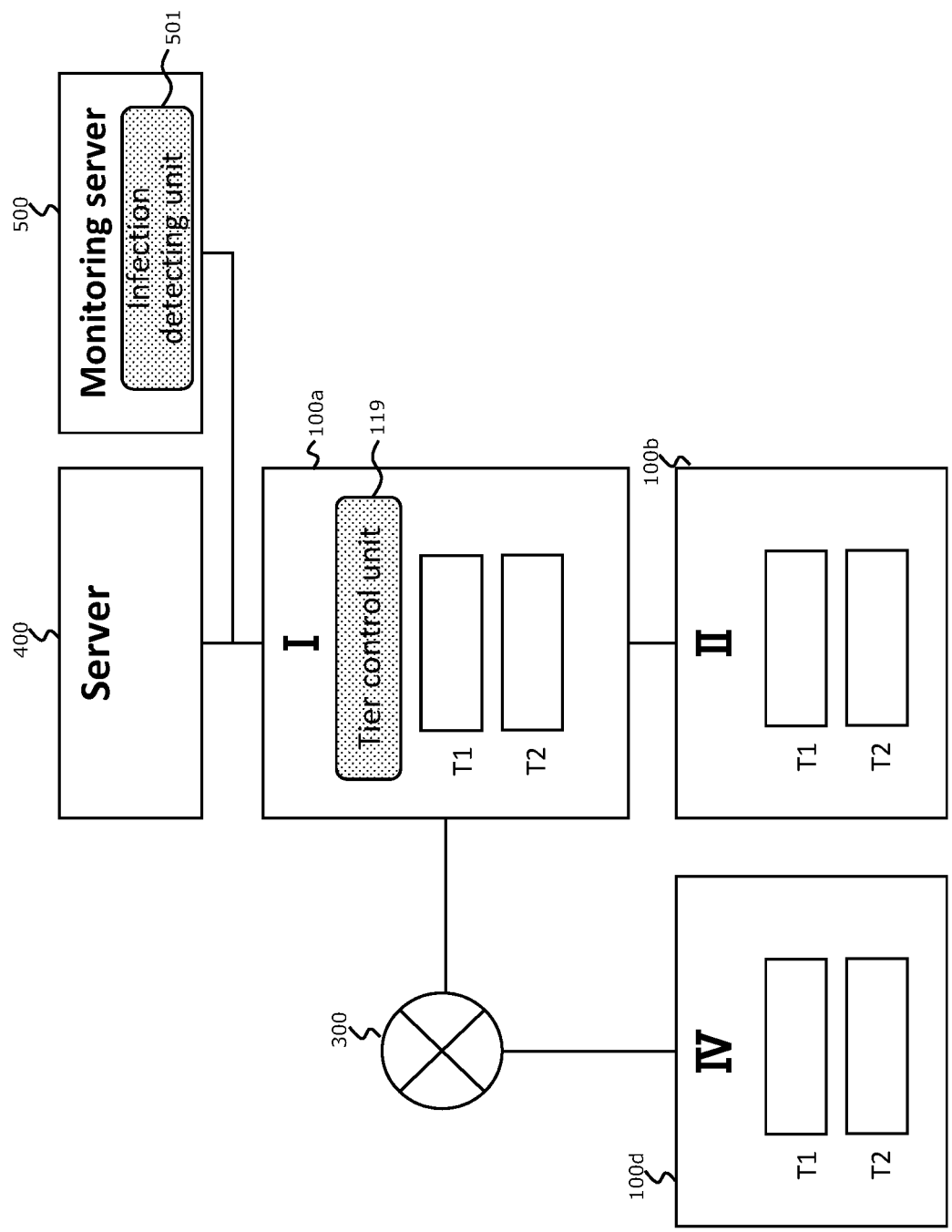
FIG. 31 is a diagram showing an example of a schematic configuration of a storage system according to a sixth embodiment.

The storage system 1 (sixth embodiment) shown in FIG. 31 is provided with three storage apparatuses 100a, 100b, and 100d. The storage apparatus 100b is managed at a same location or by a same manager as the storage apparatus 100a and is coupled by a communication line. In addition, the storage apparatus 100d is coupled to the storage apparatus 100a via the network 300. Therefore, classification of the storage apparatus 100a is set to I, classification of the storage apparatus 100b is set to II, and classification of the storage apparatus 100d is set to IV.

Figure 32:
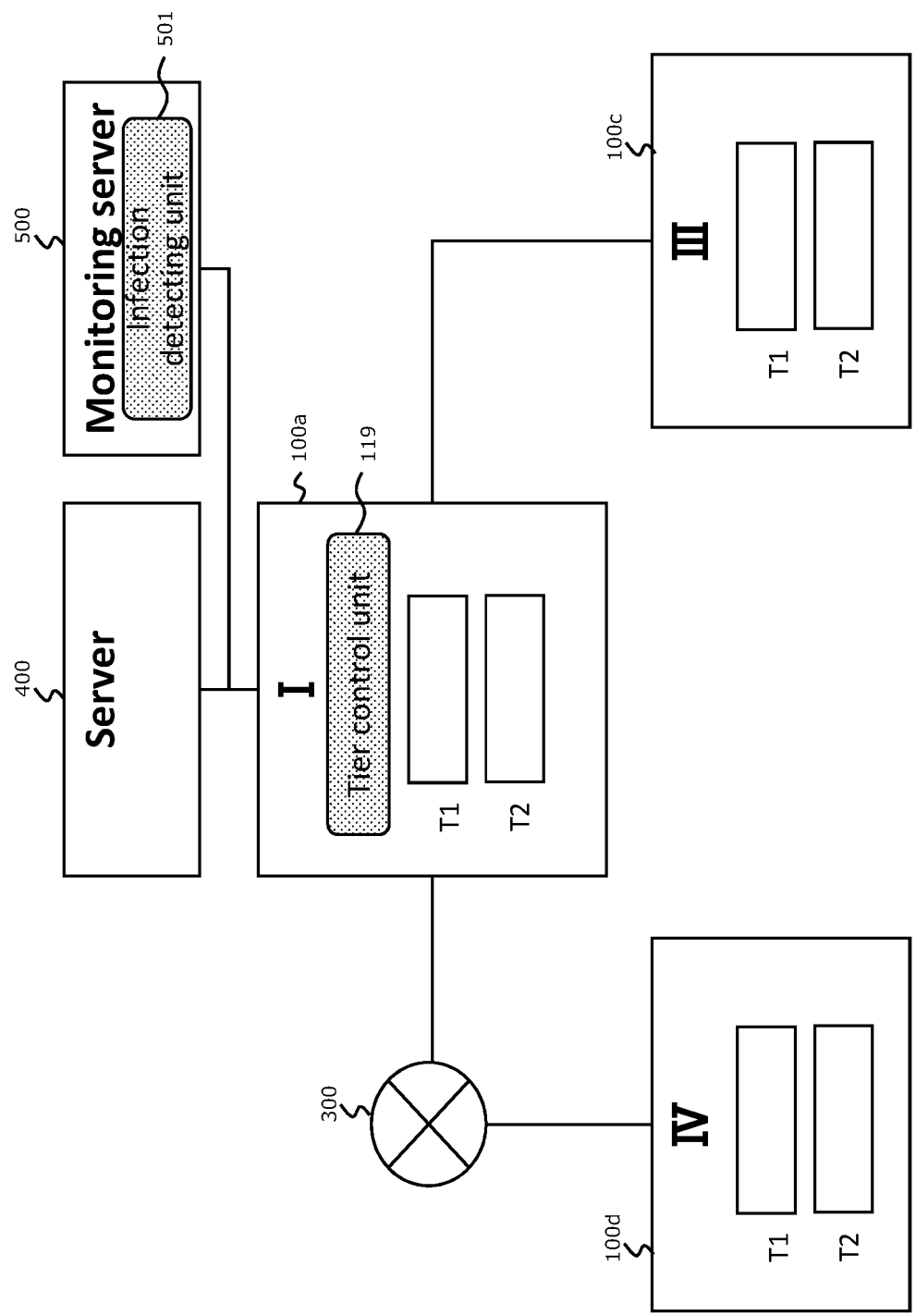
FIG. 32 is a diagram showing an example of a schematic configuration of a storage system according to a seventh embodiment.

The storage system 1 (seventh embodiment) shown in FIG. 32 is provided with three storage apparatuses 100a, 100c, and 100d. The storage apparatus 100c is managed at a same location or by a same manager as the storage apparatus 100a and is coupled by a communication line. However, since the communication line coupling the storage apparatus 100a and the storage apparatus 100c to each other is less reliable than the communication line coupling the storage apparatus 100a and the storage apparatus 100b shown in FIG. 31 to each other, classification of the storage apparatus 100a is set to I and classification of the storage apparatus 100c is set to III. In addition, the storage apparatus 100d is coupled to the storage apparatus 100a via the network 300. Therefore, classification of the storage apparatus 100d is set to IV.

Figure 33:
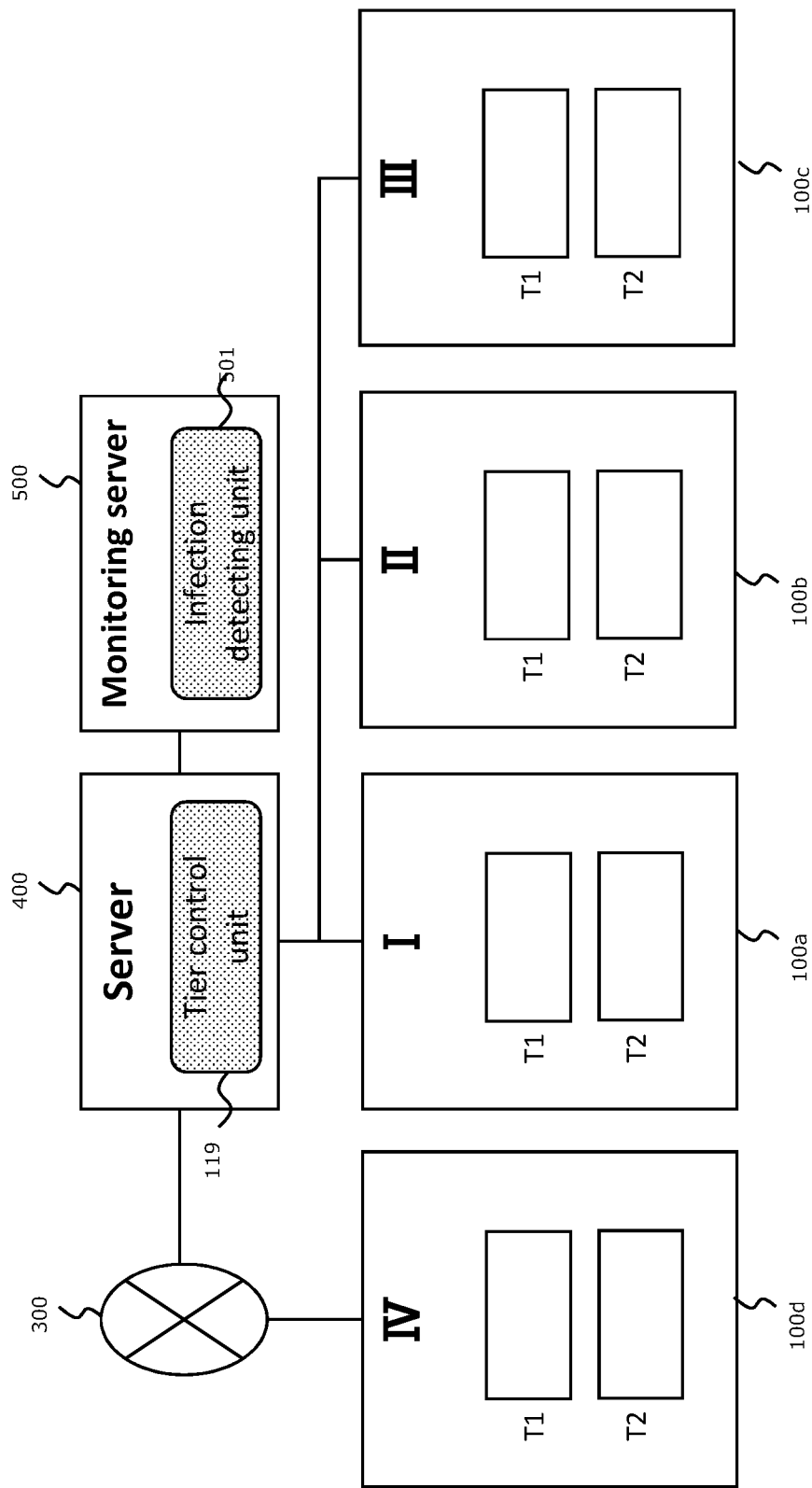
FIG. 33 is a diagram showing an example of a schematic configuration of a storage system according to an eighth embodiment.

The storage system 1 (eighth embodiment) shown in FIG. 33 is configured in more or less the same manner as the storage system 1 shown in FIG. 1. However, while the tier control unit 119 is provided in the storage apparatus 100a in the storage system 1 shown in FIG. 1, the tier control unit 119 is provided in the server A 400 in the storage system 1 shown in FIG. 33. Therefore, the storage apparatus 100d is coupled to the server A 400 via the network 300.

According to the present embodiment configured as described above, a storage system capable of selectively using cost, performance, reliability, and security characteristics of a storage device in an appropriate manner and a file arrangement method of the storage system can be realized.

In other words, according to the present embodiment, tier rearrangement that takes a security requirement and a reliability requirement of data into consideration can be performed. That is, according to the present embodiment, in a configuration in which physical storage devices with different security levels and reliability are present, advantages of tier rearrangement can be enjoyed with pieces of data of which security requirements and reliability requirements differ from each other. In addition, according to the present embodiment, high-speed restore after an infection can be performed. Inherent advantages of tier rearrangement are "cost optimization" and "optimization of access/restore performance".

It should be noted that the components of the embodiments presented above have been described in detail in order to provide a clear understanding of the present invention, and the present invention is not necessarily limited to embodiments that include all of the components described above. Furthermore, a part of the components of the respective embodiments may be added to, deleted from, or replaced with other components.

Moreover, the respective components, functions, processing units, processing means, and the like described above may be partially or entirely realized by hardware by, for example, designing with integrated circuits or the like. In addition, the present invention can also be realized by a program code of software that realizes the functions of the embodiments. In this case, a computer is provided with a storage medium on which the program code is recorded, and a processor included in the computer reads the program code stored in the storage medium. In this case, the program code itself that is read from the storage medium is to realize the functions of the embodiments described above, and the program code itself and the storage medium storing the program code are to constitute the present invention. As the storage medium for supplying such a program code, for example, a flexible disk, a CD-ROM, a DVD-ROM, a hard disk, an SSD (Solid State Drive), an optical disk, a magneto-optical disk, a CD-R, a magnetic tape, a nonvolatile memory card, or a ROM are used.

In addition, the program code that realizes the functions described in the present embodiment can be implemented in a wide range of programs or scripting languages such as assembler, C/C++, perl, Shell, PHP, Java (registered trademark), and Python.

In the embodiments described above, control lines and information lines are those considered necessary for purposes of illustration and do not necessarily represent all control lines and information lines as far as a product is concerned. All of the components may be coupled to each other.

What is claimed is:

1. A storage system which is coupled to a host and which performs an operation with respect to a stored file based on a file operation request from the host, the storage system comprising:

a controller; and a plurality of storage devices of which reliability and security levels differ from one another, wherein the controller determines a reliability requirement and a security requirement of the stored file based on at least one of a type and a content of the stored file, determines a storage device from among the plurality of storage devices in which to store the stored file based on the determined reliability requirement and the determined security requirement, and stores the stored file in the determined storage device, wherein the controller manages the plurality of storage devices as a first volume in which the stored file is to be stored and a second volume in which a backup of the stored file is to be stored, the second volume is constituted of a plurality of physical storage devices with different performances, the controller manages the second volume by classifying the physical storage devices into a plurality of storage tiers according to performances of the physical storage devices, and the controller further determines the storage tier in which a backup file being a backup of the stored file is to be stored based on the determined reliability requirement and the security requirement of the stored file and stores the backup wherein the storage system has a memory, the memory stores information that identifies the stored file, information that identifies the host having issued the file operation request with respect to the stored file, and an access history table having a time point at which update processing of the stored file had been performed, and the controller refers to the access history table to identify the stored file that is presumed not to be infected with the malware and performs rearrangement of the storage tier with respect to the identified stored file.

2. The storage system according to claim 1, wherein the controller performs rearrangement of the storage tier in which the backup file is stored in consideration of a time point of occurrence of a logical failure of the host which is triggered by a detection of a failure of an application and/or a system of the host.

3. The storage system according to claim 2, wherein the controller performs rearrangement of the storage tier in which the backup file is stored in consideration of an infection time point of the host which is triggered by a detection of a malware infection of the host.

4. The storage system according to claim 3, wherein the storage system is coupled to a plurality of the hosts, and the controller performs rearrangement of the storage tier in which the backup file is stored based on information that identifies the host having been infected with the malware and the infection time point of the host having been infected with the malware.

5. The storage system according to claim 1, wherein the controller rearranges the identified stored file to the storage tier on a higher level than the storage tier in which the identified stored file is currently arranged.

6. The storage system according to claim 5, wherein the controller rearranges the identified stored file to the storage tier on an uppermost level.

7. The storage system according to claim 1, wherein the controller rearranges the identified stored file to the storage tier of the storage device with higher reliability and a higher security level than the storage device in which the identified stored file is currently arranged.

8. The storage system according to claim 1, wherein the memory stores information that identifies the stored file, a time point at which update processing of the stored file had been performed, and a generation information management table having a file size of the stored file, and the controller also refers to the generation information management table to identify the stored file that is presumed not to be infected with the malware and performs rearrangement of the storage tier with respect to the identified stored file.

9. A file arrangement method in a storage system which is coupled to a host and which performs an operation with respect to a stored file based on a file operation request from the host, the storage system including: a controller; and a plurality of storage devices of which reliability and security levels differ from one another, the file arrangement method comprising the steps of:

determining a reliability requirement and a security requirement of the stored file based on at least one of a type and a content of the stored file;

determining a storage device from among the plurality of storage devices in which to store the stored file based on the determined reliability requirement and the determined security requirement;

storing the stored file in the determined storage device, managing the plurality of storage devices as a first volume in which the stored file is to be stored and a second volume in which a backup of the stored file is to be stored, wherein the second volume is constituted of a plurality of physical storage devices with different performances;

managing the second volume by classifying the physical storage devices into a plurality of storage tiers according to performances of the physical storage devices, and determining the storage tier in which a backup file being a backup of the stored file is to be stored based on the determined reliability requirement and the security requirement of the stored file and stores the backup, wherein the storage system has a memory, the memory stores information that identifies the stored file, information that identifies the host having issued the file operation request with respect to the stored file, and an access history table having a time point at which update processing of the stored file had been performed, and the controller refers to the access history table to identify the stored file that is presumed not to be infected with the malware and performs rearrangement of the storage tier with respect to the identified stored file.

\* \* \* \* \*